(12) United States Patent
Paczkowski et al.

(10) Patent No.: US 12,526,619 B2
(45) Date of Patent: Jan. 13, 2026

(54) RELATIONSHIP ENTITY MANAGEMENT SYSTEMS AND METHODS FOR TELECOMMUNICATIONS NETWORK USER EQUIPMENT

(71) Applicant: T-MOBILE INNOVATIONS LLC, Overland Park, KS (US)

(72) Inventors: Lyle Walter Paczkowski, Mission Hills, KS (US); Marouane Balmakhtar, Fairfax, VA (US); Galip Murat Karabulut, Vienna, VA (US); Mark Richard Bales, Lee's Summit, MO (US); Robert Keith Butler, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 324 days.

(21) Appl. No.: 18/149,554

(22) Filed: Jan. 3, 2023

(65) Prior Publication Data

US 2024/0224022 A1 Jul. 4, 2024

(51) Int. Cl.
*H04W 8/18* (2009.01)
*H04W 76/14* (2018.01)

(52) U.S. Cl.
CPC ............. *H04W 8/18* (2013.01); *H04W 76/14* (2018.02)

(58) Field of Classification Search
CPC ................................ H04W 8/18; H04W 76/14
USPC ....................................................... 455/422.1
See application file for complete search history.

(56) References Cited

U.S. PATENT DOCUMENTS

| 2018/0035353 | A1* | 2/2018 | Lee | H04W 76/10 |
| 2018/0227970 | A1* | 8/2018 | Jin | H04W 36/18 |
| 2020/0112593 | A1* | 4/2020 | Tsai | H04W 12/033 |
| 2021/0385642 | A1* | 12/2021 | Di Girolamo | H04W 8/18 |
| 2022/0405745 | A1* | 12/2022 | Pratz | G06Q 20/3821 |
| 2024/0045851 | A1* | 2/2024 | Li | G06F 16/23 |

* cited by examiner

*Primary Examiner* — Hirdepal Singh
(74) *Attorney, Agent, or Firm* — Shook, Hardy & Bacon L.L.P.

(57) ABSTRACT

Relationship entity management systems and methods for telecommunications network user equipment are disclosed. In some embodiments, two or more UEs may form relationship entity in which they operate together to provide a service using a telecommunications network. A UE acting on behalf of the relationship entity may communicate a registration request message to a network function of the operator core network that includes which the network function may use to assign a relationship ID to the relationship entity. Records of relationship entity actives and/or resources used may be recorded to a relationship history ledger under the relationship ID, such as a block-chain technology ledger for example. In some embodiments, a UE while operating on the operator core network as part of the relationship entity may be authorized to access network services otherwise not available to the UE when they are not part of the relationship entity.

17 Claims, 11 Drawing Sheets

RELATIONSHIP ENTITY MANAGEMENT SYSTEMS AND METHODS FOR TELECOMMUNICATIONS NETWORK USER EQUIPMENT

BACKGROUND

Modern telecommunications networks, such as $3^{rd}$ Generation Partnership Project (3GPP) 5G ($5^{th}$ generation) telecommunication networks, are primarily designed to transport data to provide network services to user equipment (UE), for example, using wireless connections over licensed radio frequency channels. As these telecommunications networks have transitioned from voice carriers to data carriers, there is a growing interest in utilizing the high data speeds and bandwidth available from telecommunications networks to obtain access to data and content, and/or to perform other operations and transactions with servers accessible through the telecommunications. For example, UE may query network resources to obtain content such as documents, email, electronic messaging, streaming audio and video, and/or a vast array of other information. The use of telecommunications networks has also evolved to include the arrangement of individual UE into entities that use the telecommunications network for connectivity to effectively establish systems of interworking UE devices that operate in concert with each other to perform tasks for the benefit of one or more users. For example, a user may use their UE smart device, such as their smartphone, to engage with another UE smart device, such as an automated vehicle. Each of the smartphone and automated vehicle may have their own individual subscriptions and establish their own communication links with the telecommunications networks, while the smartphone and the automated vehicle work together to establish an ad-hoc system with each other, using the telecommunications network, to accomplish the larger task of transporting the user from a starting point to a destination.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The present disclosure is directed, in part, to systems and methods for relationship entity management for telecommunications network user equipment, substantially as shown and/or described in connection with at least one of the figures, and as set forth more completely in the claims. One or more of the embodiments presented in the disclosure provide for, among other things, systems and methods for relationship entity management for telecommunications network user equipment. In some embodiments, when two or more UEs form a system together to provide a service using the telecommunications network, that system may define a relationship entity. A UE acting on behalf of the relationship entity may communicate a registration request message to a network function of the operator core network that includes, for example, UE identifiers (ID) of the UE constituent members of the relationship entity, and/or one or more items of attestation data, which the relationship entity manager network function may use to generate a relationship ID and assign that relationship ID to the relationship entity. In some embodiments, the relationship ID may further be generated by incorporating information such as, but not limited to, the task the relationship entity is performing and/or the type or category of network service that the network is to provide to the relationship entity. The ability to establish a record of the existence of the relationship entity may enable the operator core network to track the relationship entity's activities over time for evidentiary, billing, improved service provisioning, system planning, indemnification, and/or purposes, for example. Records of relationship entity actives and/or resources used may be recorded to a relationship history ledger under the relationship ID, such as a block-chain technology ledger for example. Moreover, in some embodiments, a UE while operating on the operator core network as part of the relationship entity may be authorized to access network services otherwise not available to them when they are not part of the relationship entity.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
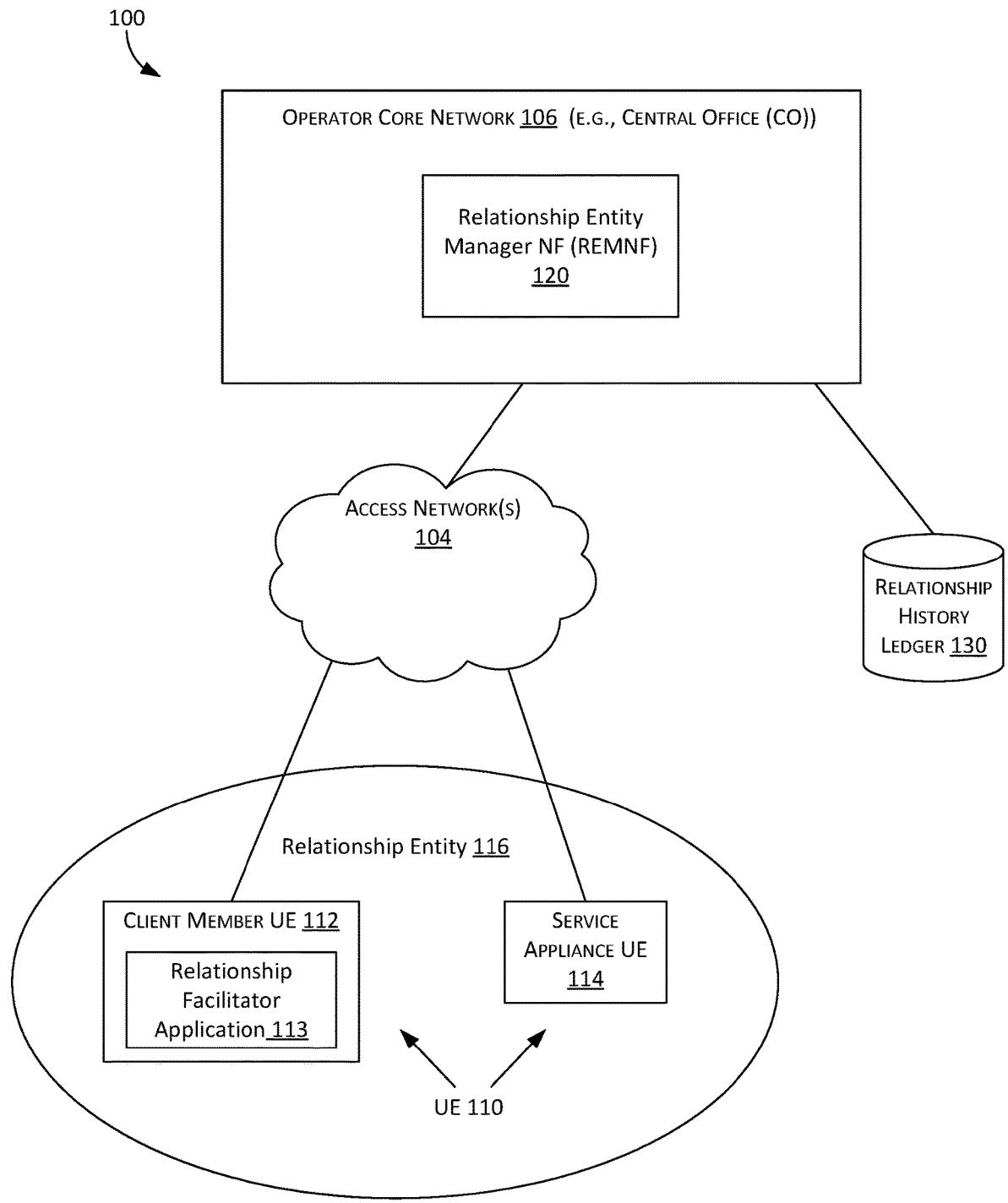
FIG. 1 is a diagram illustrating an example network environment, in accordance with some embodiments described herein.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

One or more of the embodiments presented in the disclosure provide for, among other things, systems and methods for relationship entity management for telecommunications network user equipment. When a group of user equipment (UE) becomes interconnected to form an ad-hoc (e.g., impromptu) system, each UE of that system (whether they are 3GPP UE or non-3GPP UE) may register and get themselves authenticated with the operator core network using one process or another. For example, the UE may authenticate themselves using their respective UE ID. The operator core network may use the respective UE ID to determine what network services an individual UE is subscribed to and authorized to use. However, even though the individual UE forming the ad-hoc system are effectively operating together on the network as a distinct entity (referred to herein as a "relationship entity"), the operator core network itself may not have insight to recognize how the network is being used beyond the individual activities of the component UE amongst the millions of UE connected to operator core network. The operator core network may thus be limited in ability to provide services of particular benefit to the relationship entity (e.g., relevant to the particular task the relationship entity itself was established to perform) and/or understand how the network is being used by the relationship entity.

The ability to establish a record of the existence of the relationship entity may enable the operator core network to track the relationship entity's activities over time for evidentiary, billing, improved service provisioning, system planning, indemnification, and/or purposes, for example. In addition to documenting activities of the relationship entity, records created for the relationship entity may further include information such as network end-point hardware identifiers, and/or identifiers for intervening network devices, used to transport the data associated with the activities of the relationship entity. For example, if data communicated between a first UE and a second UE of the relationship entity pass through a particular network switch in a particular data center, and/or if a network service provided to a member of the relationship entity passed through a particular network switch in a particular data center, then identifying information for the network switch and/or data center may be captured as event data and associated with the relationship entity. In this way, an inventory of network resources used to support the activities of the relationship entity may be captured. Records of relationship entity actives and/or resources used may be recorded to a ledger, such as a block-chain technology ledger for example. Moreover, in some embodiments, a UE while operating on the operator core network as part of the relationship entity may be authorized to access network services otherwise not available to them when they are not part of the relationship entity.

In some embodiments, when an relationship entity of UEs is initiated using the operator core network, one or more of the UE constituents of the relationship entity may communicate the relationship entity's establishment to an relationship entity manager network function of the operator core network, and though the relationship entity manager network function, register the relationship entity with the core network. For example, a UE acting on behalf of the relationship entity may communicate a registration request message that includes, for example, UE identifiers (ID) of the UE constituent members of the relationship entity, and/or one or more items of attestation data, which the relationship entity manager network function may use to generate a relationship ID and assign that relationship ID to the relationship entity. In some embodiments, the relationship ID may further be generated by incorporating information such as, but not limited to, the task the relationship entity is performing and/or the type or category of network service that the network is to provide to the relationship entity. The establishment, activities, events, and dissolution, of the relationship entity may all be tracked and recorded to the ledger using the relationship ID. Moreover, because the relationship ID was generated by the operator core network itself, the network may trust that the ID is legitimately associated with an authorized relationship entity and that ledger records stored to the ledger using that relationship ID can be attested to as authentic and accurate for both internal use and when shared with external organizations. In some embodiments, a distributed application (e.g., a Dapp) executing on a UE may record events for the relationship entity and send record blocks to the relationship entity manager network function using the Dapp. In some embodiments, the Dapp may be loaded onto the UE by the relationship entity manager network function. The relationship entity manager network function may, using its own Dapp, record to the ledger using the information from the record blocks received from the UE Dapp using the relationship ID. In other embodiments, the Dapp executing on the UE may be trusted to directly record to the ledger using the relationship ID.

In addition to recording actions of the relationship entity to a ledger, the operator core network may use the relationship ID to authorize and/or unlock network services for use by the relationship entity. For example, UE constituent members of the relationship entity may be ineligible to utilize a certain low-latency network slice as individual UE, but once they become members of a relationship entity associated with a certain task, the may be granted access to that certain low-latency network slice to transport session data for the relationship entity. In some embodiments, a relationship entity manager network function that generates the relationship ID may update one or more network functions of the operator core network to indicate what services that the relationship entity may subscribe to and/or is eligible to access under the issued relationship ID.

In some embodiment, when the relationship entity manager network function receives a request message to register the relationship entity, it may evaluate the identification and/or attestation data included in the request message. For example, before assigning a relationship ID for a relationship entity, the relationship entity manager network function may confirm that the individual constituent UEs of the proposed entity are permitted to form a relationship entity. The relationship entity manager network function may obtain UE subscription information for the individual constituent UE (e.g., from another network function) to confirm that each of the proposed members of the UE entity have a subscription that permits them to form the relationship entity, or not. That is, relationship entity manager network function may be programmed to permit certain classes of UE to form relationship entities together. For example, the relationship entity manager network function may permit a user's smart phone to register a relationship entity with an automated vehicle, or alternately permit the user's smart phone to register a relationship entity with a kitchen major appliance (such as refrigerator, for example), as UE types that are known to form systems together for performing recognized services. However, the relationship entity manager network function may be programmed to block registration of a non-orthodox relationship entity such as a relationship between a kitchen major appliance and an automated vehicle, which may be more indicative of a compromised UE and/or malicious activity than a recognized service.

In some embodiments, the relationship entity manager network function may evaluate the attestation data receive from a UE to further authenticate the individual constituent UEs prior to assigning the relationship ID. Attestation data may comprise authentication elements that are prearranged with the core network as being trustworthy for authenticating the UE with the core network, at least for the purpose of entering into a relationship entity. As discussed in greater detail below, authentication elements may include one or more pre-provisioned elements such as serial numbers, an international mobile subscriber identifier (IMSI) or other identifier used in cellular technologies, a pre-shared key, a public-key signature, a token, a decentralized identity, an identifier dynamically assigned by a network blockchain based ledger or server, a registration ID, or other identifier. In some embodiments, the relationship ID assigned to a relationship entity may be computed as a function of the attestation data provided to the relationship entity manager network function and/or an indication of the task the relationship entity is performing and/or the type of network service that the network is to provide to the relationship entity. For example, in some embodiments, the relationship entity manager network function may use a hash algorithm to compute the relationship ID using the attestation data received from the registration request message and/or a code related to a task and/or network service associated with the relationship entity.

In some embodiments, events related to activities of the relationship entity may be recorded to a relationship history ledger. The relationship history ledger may comprise, for example, a Hyperledger, distributed ledger technology (DTL) based ledger, or other blockchain technology based ledger. Records recorded to the relationship history ledger may be generated by one or more Dapps or smart contracts executed by the relationship entity manager network function and/or one or more member UEs of a relationship entity. In some embodiments, the relationship history ledger may establish and assign an individual block sequence (e.g., a blockchain) to a relationship entity, and record received record blocks representing events related to the relationship entity to that sequence. In some embodiments, record blocks representing events related to the relationship entity may instead, or additionally, be recorded to other block sequences (e.g., other blockchains) that may, for example, include blocks associated with other relationship entities. For example, the relationship history ledger may comprise a blockchain assigned to a specific UE (such as an automated vehicle, for example). In such an embodiment, for each session where that UE is involved as a constituent member of a relationship entity, record blocks representing events related to the relationship entity are added to that UE's blockchain. As such, the UE's blockchain would over time build a history of each session of the different relationship entities that the UE had previously joined, and the relevant events that occurred with those relationship entities.

Advantageously, the embodiments presented herein, at least in part, provide system and methods for an operator core network to more efficiently utilize network resources by recognizing that a group of UE are operating together as a system of UE (a relationship entity), and assigning a relationship ID to that system. The operator core network may render services available to that relationship entity, using the relationship ID, resulting in better utilization of network services as compared to merely providing services to individual UE. Moreover, the relationship ID may be used to track activities and events of the relationship entity as a separate entity distinct from its component UE member, which may serve to create a record of network utilization that more accurately reflects the tasks and/or services that the network is being leveraged to perform.

FIG. 1 is a diagram illustrating an example network environment 100 embodiment for a wireless communication system. Network environment 100 is but one example of a suitable telecommunications network and is not intended to suggest any limitation as to the scope of use or functionality of the embodiments disclosed herein. Neither should the network environment be interpreted as having any dependency or requirement relating to any one or combination of components illustrated.

As shown in FIG. 1, network environment 100 comprises an operator core network 106 (also referred to as a "core network") that provides one or more network services to one or more UE 110 via one or more access networks 104. In some embodiments, network environment 100 comprises, at least in part, a wireless communications network.

In the embodiment of FIG. 1, UE 110 are depicted as members of a relationship entity 116. Within the context of the relationship entity 116, the UE 110 may assume different roles in furtherance of performing a task or service that the relationship entity 116 was formed to accomplish. For example, a UE 110 may function as a client member UE 112. In some embodiments, a client member UE 112 may be a UE 110 that is owned and/or operated by a user benefiting from the service being performed by the relationship entity 116. Another UE 110 may function a service appliance UE 114 that is an auxiliary member of the relationship entity 116 and contributes to executing the service being performed by the relationship entity 116. For example, an automated vehicle may constitute a UE 110 that is a service appliance 114 in that it operates, at least in part, to achieve the task of transporting an operator of the client member 112 from a starting point to a destination. It should be appreciated that in some embodiments, a relationship entity 116 may comprise one or more UE 110 functioning as a client member 112 and/or one or more UE 110 functioning as a service appliance 114. It should also be appreciated that in some embodiments, roles of a client member UE 112 versus a service appliance UE 114 are not strictly delineated, but may be distributed across UE 110 of a relationship entity 116. Generally, a client member 112 may refer to a UE 110 member of a relationship entity 116 that executes a relationship facilitator application 113 that interacts with a relationship entity manager network function (REMNF) 120 of the operator core network 106 and/or relationship history ledger 130 on behalf of the relationship entity 116. It should also be appreciated that in some embodiments each of the UE 110 of a relationship entity may comprises automated devices not directly under the control of a user.

The one or more access networks 104 may comprise one or more 3GPP radio access networks, one or more non-3GPP access networks, and/or a combination of one or more 3GPP radio access networks and one or more non-3GPP access networks. Individual UE 110, whether in the roll of a client member UE 112 or a service appliance UE 114, may communicate with the operator core network 106 via the access network(s) 104 over one or both of uplink (UL) radio frequency (RF) signals and downlink (DL) radio frequency (RF) signals. In some embodiments, UE 110 may communicate with the operator core network 106 via the access network(s) 104 via wired network connections. The access network(s) 104 may comprise a multi-modal network (for example comprising one or more multi-modal access devices) where multiple radios supporting different systems are integrated into the access network(s) 104. Such a multi-modal access network may support a combination of 3GPP radio technologies (e.g., 4G, 5G and/or 6G) and/or non-3GPP radio technologies. In some embodiment, the access network(s) 104 may comprise a terrestrial wireless communications base station and/or may be at least in part implemented as a space-based access network (e.g., comprising a space-based wireless communications base station).

Generally, an individual UE 110 may comprise a device capable of unidirectional or bidirectional communication with the operator core network 106 via wireless and/or wired communication links. The network environment 100 may be configured for wirelessly connecting UEs 110 to other UEs 110 via the same access network(s) 104, via other access networks, via other telecommunication networks, and/or to connect UEs 110 to a publicly-switched telecommunication network (PSTN). The network environment 100 may be generally configured, in some embodiments, for connecting UE 110 to data, content, and/or services that may be accessible from one or more application servers or other functions, nodes, or servers (such as servers of a data network).

UE 110 are in general, forms of equipment and machines such as but, not limited to, Internet-of-Things (IoT) devices and smart appliances, autonomous or semi-autonomous vehicles including cars, trucks, trains, aircraft, urban air mobility (UAM) vehicles and/or drones, industrial machinery, robotic devices, exoskeletons, manufacturing tooling, thermostats, locks, smart speakers, lighting devices, smart receptacles, controllers, mechanical actuators, remote sensors, weather or other environmental sensors, wireless beacons, cash registers, turnstiles, security gates, or any other smart device. In some embodiments, UE 110 may include computing devices such as, but not limited to, handheld personal computing devices, cellular phones, smart phones, tablets, laptops, wearable computing devices (e.g., a smart watch) and/or similar consumer equipment, or stationary desktop computing devices, workstations, servers and/or network infrastructure equipment. As such, the UE 110 may include both mobile UE and stationary UE. Moreover, UE 110 may include 3GPP and non-3GPP devices.

As is discussed in greater detail below, the UE 110 can include one or more processors, and one or more non-transient computer-readable media for executing code to carry out the functions of the UE 110 described herein (including in some embodiments, communicating with the REMNF 120 and/or relationship history ledger 130). The computer-readable media may include computer-readable instructions executable by the one or more processors. In some embodiments, the UE 110 may be implemented using a computing device 700 as discussed below with respect to FIG. 7.

In some embodiments, to initiate registering the relationship entity 116 with the operator core network 106, one or more of the UE 110 members of the relationship entity 116, such as a client member 112, may communicate with the REMNF 120 of the operator core network 106. Though the relationship entity manager network function 120, a client member 112 may register the relationship entity 116 with the core network 106. For example, a client member 112 acting on behalf of the relationship entity 116 may communicate a registration request message to the relationship entity manager network function 120. The registration request message may include, for example, UE identifiers (ID) of the UE 110 that are members of the relationship entity 116. The registration request message may include one or more items of attestation data, which the relationship entity manager network function 120 may use to generate a relationship ID and assign that relationship ID to the relationship entity 116. In some embodiments, the relationship entity manager network function 120 may also obtain information about the service the relationship entity is performing and/or the type or category of network service that the network is to provide to the relationship entity, which may be referred to as a service classification ID, and incorporate that service classification ID information into generating the relationship ID. Once the relationship ID is assigned to the relationship entity 116, one or more of entity establishment, UE membership, activities, events, and dissolution, of the relationship entity 116 may be tracked and reported to one or more network functions of the operator core network 106 and/or recorded to the relationship history ledger 130 using the relationship ID.

Records stored to the relationship history ledger 130 establish an immutable archive of events relevant to the relationship entity 116, which may be accessed and used for various purposes. The relationship ID may be generated by the operator core network itself. The operator of the operator core network may therefore have trust that records stored to the relationship history ledger 130 under that relationship ID are legitimately associated with an authorized relationship entity 116. Moreover, because the ledger records are generated using a trusted relationship facilitator application 113 (as discussed further below), those records associated with the relationship ID can be attested to as authentic and accurate for both internal use and when shared with external organizations.

In some embodiment, when the relationship entity manager network function 120 receives a request message from the client member 112 to register the relationship entity 116, it may evaluate identification data, attestation data, and/or service classification ID data, that may be included in the request message. For example, before assigning a relationship ID for a relationship entity 116, the relationship entity manager network function 120 may confirm that the individual constituent UEs 110 of the proposed entity are permitted to form a relationship entity 116. For example, the relationship entity manager network function 120 may query subscription information for the UEs 110 from other network functions of the operator core network 106 (such as the UDR and/or UDSF discussed below) to confirm that each of the proposed members of the UE entity have a subscription that permits them to form the relationship entity, or not.

In some embodiments, the relationship entity manager network function 120 may evaluate the attestation data provided by a registration request message to further authenticate the individual constituent UE 110 prior to assigning the relationship ID. Attestation data may comprise authentication elements that are prearranged with the operator core network 106 for authenticating that the UE 110 identified as forming the relationship ID 116 are authorized to operate on the network as members of a relationship entity 116. As discussed in greater detail below, authentication elements may include on or more pre-provisioned elements such as serial numbers, an international mobile subscriber identifier (IMSI) or other identifier used in cellular technologies, a pre-shared key, a public-key signature, a decentralized identity, an identifier dynamically assigned by a network blockchain based ledger or server, a registration ID, or other identifier. In some embodiments, the relationship ID assigned to a relationship entity 116 may be computed as a function of the attestation data provided to the relationship entity manager network function 120 and/or the service classification ID of the task the relationship entity 116 is performing and/or the type of network service that the operator core network 106 is to provide to the relationship entity 116. For example, in some embodiments, the relationship entity manager network function 120 may use a hash algorithm to compute the relationship ID using as input the attestation data received from the registration request message and/or a service classification ID.

The attestation data provided by the client member 112 may include one or pre-provisioned elements associated with one or more of the UE 110 forming the relationship entity 116. In some embodiments, pre-provisioned elements may comprise one or more embedded serial numbers or other identifiers programmed into the UE, for example, by the UE 110 manufacturer and/or or by the network operator. Pre-provisioned elements may comprise, for example, a device package ID, a library ID, serial numbers or unalterable identifiers embedded in the UE 110. For a UE 110 that does comprise a SIM card or eSIM, then pre-provisioned elements build into SIM technology may be used to derive a registration ID. In some embodiments, the pre-provisioned elements may be combined and/or processed to define a registration ID associated with an individual UE 110. The relationship entity manager network function 120 may be programmed to validate the attestation data to confirm that the attestation data received is consistent with attestation data expected. If the attestation data is valid, then the relationship entity manager network function 120 may proceed to register the relationship entity 116 and assign that entity a relationship ID that may be used in conjunction with obtaining services from other network functions of the operator core network 106 and/or for recording events to the relationship history ledger.

As a non-exhaustive listing of identifiers that may be used as pre-provisioned elements, pre-provisioned element may include one or more of: an International Mobile Equipment Identity (IMEI) identifier and/or a Mobile Equipment Identifier (MEID) (e.g., which be stored in a subscriber identity module (SIM) card or embedded SIM (eSIM) of the UE 110), one or more elements of an integrated circuit card identifier (ICCID), a permanent equipment identifier (PEI), a mobile subscriber international subscriber directory number (MSISDN), a mobile subscription identification number (MSIN), an international mobile subscriber identity (IMSI), mobile country codes (MCC), a subscription permanent identifier (SUPI), mobile network codes (MNC), a UE serial number, a CPU serial number, a device hardware serial number and/or other identifiers. Other example pre-provisioned elements may include keys or other authentication vectors, for example, authentication vectors corresponding to EAP-AKA' and/or 5G-AKA authentication protocols. In some embodiments, a pre-provisioned element may comprise one or more decentralized identifiers (DIDs), such as World Wide Web Consortium (W3C) DIDs for example. In some embodiments, a pre-provisioned element may comprise a DID that resolves to a DID document. The DID document may be stored at a data registry (e.g., a verifiable data registry). For example, a DID may include a Universal Resource Identifier (URI) that associates a UE 110 (as a DID subject) with a DID document. The DID may include, for example, cryptographic public keys that the UE 110 may use to authenticate itself with the operator core network 106, and prove its association with the DID (e.g., the device ID). In some embodiments, the pre-provisioned element may be based on a self-sovereign identity (SSI) paradigm. For example, the UE 110 may present a pre-provisioned element to the relationship entity manager network function 120, which may verify that the pre-provisioned element was issued from a trusted issuer. In some embodiments, a pre-provisioned element may comprise a combination of identifiers such as any of those described herein. In some embodiment one or more of the pre-provisioned elements may be managed and verified using public-key cryptography in conjunction with a distributed ledger (e.g., using a Dapp, crypto wallet, or the like, for example). For example, in some embodiment the pre-provisioned element for a UE 110 may be generated by back-end blockchain ledger or other blockchain technology and downloaded to the UE 110. In other words, the pre-provisioned element may comprise one of, or a combination of, hardware identifiers, network address identifiers, serial numbers, keys, sequences, component identifiers (e.g., CPU IDs), and/or other identifiers such a as discussed herein.

For a given UE, a designated set of one or more pre-provisioned elements may be used as inputs to the relationship entity manager network function 120 for registering and/or authenticating the relationship entity 116 and/or for a unique relationship ID that is uniquely associated with that relationship entity 116. For example, a hash code algorithm may be computed from the set of pre-provisioned elements to derive the registration ID that is passed as attestation data to the relationship entity manager network function 120 for registering (e.g., provisioning) the relationship entity 116 with the operator core network 106.

In various embodiments, UE 110 forming a relationship entity 116 may either connect to the operator core network 106 through the same access network 104, or through different access networks 104. Also as mentioned above, in some embodiments, relationship entity 116, in some embodiments, may comprise more than one UE 110 that has the resources to serve the role of client member UE 112 and executes a relationship facilitator application 113 that interact with the REMNF 120 and/or relationship history ledger 130 on behalf of the relationship entity 116. In some embodiments, when a relationship entity 116 comprises two (or more) such client member UE 112, they may negotiate to determine which one will interact with the REMNF 120 and/or relationship history ledger 130 on behalf of the relationship entity 116. In some embodiments, when a relationship entity 116 comprises two (or more) such client member UE 112, they may each interact with the REMNF 120 and/or relationship history ledger 130 on behalf of the relationship entity 116. For example, the respective applications 113 executing on those client member UEs 112 may operate in parallel to provide redundancy in information recorded to the relationship history ledger 130. Alternatively, in some embodiments, each respective relationship facilitator application 113 may select different sets of data for recordation to the relationship history ledger 130.

Figure 2:
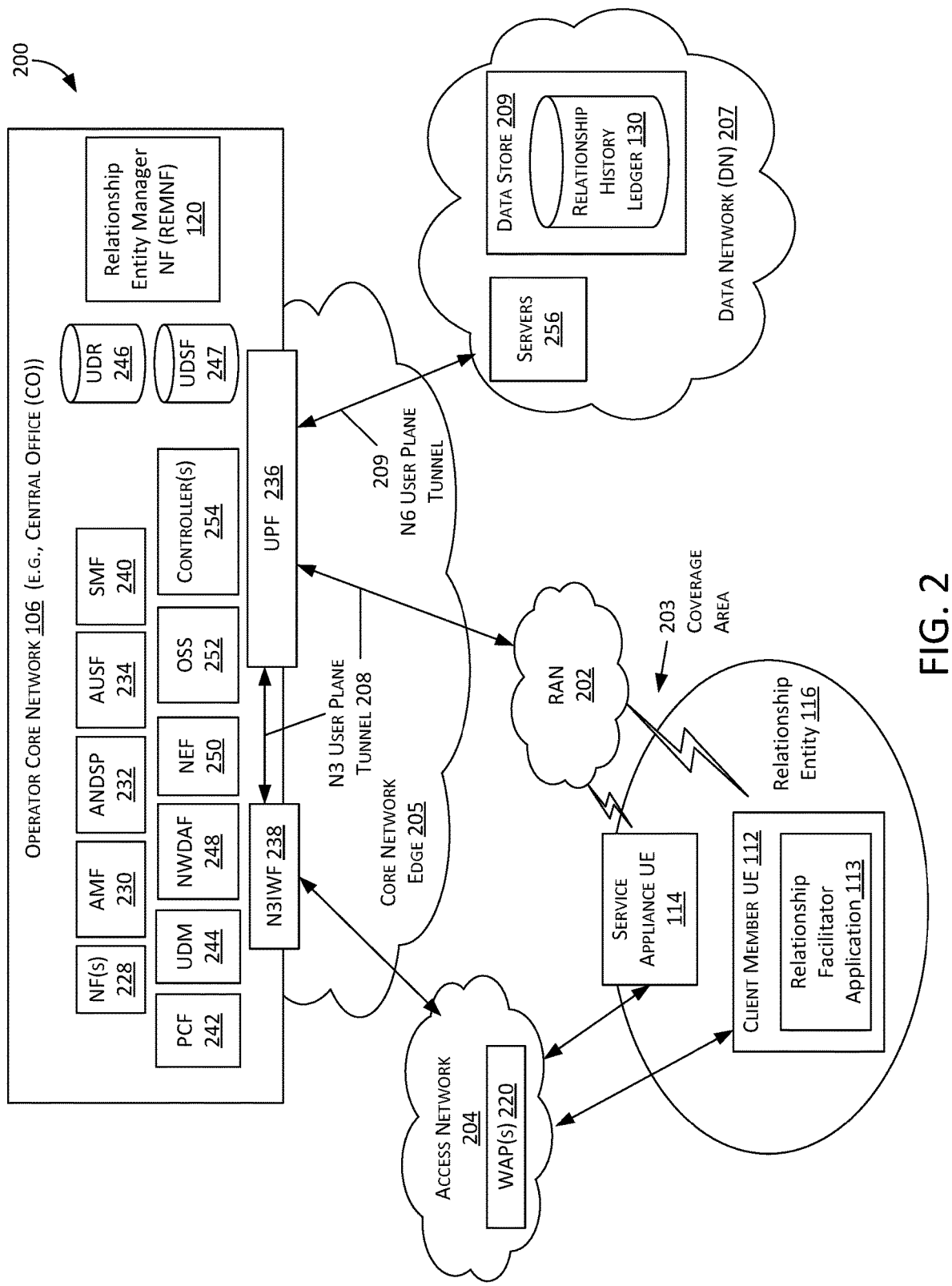
FIG. 2 is a diagram illustrating an example network environment, in accordance with some embodiments described herein.

FIG. 2 is a diagram illustrating at 200 a more detailed example implementation of network environment 100. As previously discussed with respect to FIG. 1, in some embodiments, the one or more access networks 104 may comprise one or more 3GPP radio access networks (such as radio access network 202) and/or one or more non-3GPP access networks (such as access network 204) and/or a combination thereof. In some embodiments, a radio access network 202 comprises one or more radio access networks (RANs). Each RAN 202 may provide wireless connectivity access to one or more UE 110 operating within a coverage area 203 associated with that RAN 202 (such as a client member 112 and/or a service applicant 114). A RAN is often referred to as a base station, cell site, or cellular base station. The RAN may implement wireless connectivity using, for example, 3GPP technologies. The RAN 202 may be referred to as an eNodeB in the context of a 4G Long-Term Evolution (LTE) implementation, a gNodeB in the context of a 5G New Radio (NR) implementation, or other terminology depending on the specific implementation technology. In some embodiments, the RAN 202 may comprise in part components of a customer premises network, such as a distributed antenna system (DAS) for example. In some embodiments, the RAN 202 may comprise a non-terrestrial base station, such as a base station implemented by an Earth orbiting satellite. An access network 204 may comprise a non-3GPP customer premises network, such as a local area network or intra-net. The access network 204 may provide wired access to one or more UE 110 (such as a client member 112 and/or a service applicant 114). The access network 204 may provide wireless access to one or more UE 110 via one or more wireless access points 220 (WAPs) such as, but not limited to, IEEE 802.11 (WiFi), IEEE 802.15.1 (Bluetooth), and/or IEEE 802.15.4 (ZigBee) access points.

One or both of radio access network 202 and/or access network 204 may comprise a multi-modal network (for example comprising one or more multi-modal access devices) where multiple radios supporting different systems are integrated into the access networks 202 and 204. Such a multi-modal access network may support a combination of 3GPP radio technologies (e.g., 4G, 5G and/or 6G) and/or non-3GPP radio technologies. Individual UE 110 may communicate with the operator core network 106 via the RAN 202 over one or both of uplink (UL) radio frequency (RF) signals and downlink (DL) radio frequency (RF) signals. Individual UE 110 may also, or instead, communicate with the operator core network 106 via the access network 204 over one or both of uplink (UL) radio frequency (RF) signals and downlink (DL) radio frequency (RF) signals and/or via wired network connections.

The radio access networks 202 and/or access network 204 may be coupled to the operator core network 106 via a core network edge 205 that comprises wired and/or wireless network connections that may themselves include wireless relays and/or repeaters. In some embodiments, the RAN 202 and/or access network 204 may be coupled to the operator core network 106 at least in part by a backhaul network such as the Internet or other public or private network infrastructure. Core network edge 205 comprises one or more network nodes or other elements of the operator core network 106 that may define the boundary of the operator core network 106 and may serve as the architectural demarcation point where the operator core network 106 connects to other networks such as, but not limited to RAN 202 and/or access network 204, the Internet, and/or other third-party networks.

It should be understood that in some aspects, the network environment 100 as illustrated in any of the figures herein may not comprise a distinct operator core network 106, but rather may implement one or more features of the operator core network 106 within other portions of the network, or may not implement them at all, depending on various carrier preferences.

As shown in FIG. 2, network environment 200 may also comprise at least one data network (DN) 207 coupled to the operator core network 106 (e.g., via the network edge 205). Data network 207 may include a data store 209 that includes a relationship history ledger 130, as further discussed herein. In some embodiments, UE 110 may access services and/or content provided by one or more servers 256 of DN 207. In some embodiments, servers 256 may include one or more client systems that access records of the relationship history ledger 130 to perform one or more operations. In some embodiments, a server 256 may implement a client member UE 112 and/or service appliance UE 114 that may form a member of a relationship entity 116. The relationship history ledger 130 may comprise an element of a distributed ledger network (DLN), distributed ledger technology (DLT), Hyperledger, or other blockchain based records repository.

In some implementations, the operator core network 106 may comprise modules, also referred to as network functions (NFs), generally represented in FIG. 2 as NF(s) 228. Such network functions may include, but are not limited to, one or more of a core access and mobility management function (AMF) 230, an access network discovery and selection policy (ANDSP) 232, an authentication server function (AUSF) 234, a user plane function (UPF) 236, non-3GPP Interworking Function (N3IWF) 238, a session management function (SMF) 240, a policy control function (PCF) 242, unified data management (UDM) 244, an unified data repository (UDR) 246, Unstructured Data Storage Function (UDSF) 247, Network Data Analytics Function (NWDAF) 248, a network exposure function (NEF) 250, and an operations support system (OSS) 152. Also as shown in FIG. 2, the network functions of the operator core network 106 may include the relationship entity manager network function (REMNF) 120. The REMNF 120 may be implemented as an independent network function 228 of the operator core network 106, or integrated at least in part into another network function involved in device registration such as the UDR 246 and/or the UDSF 247. Implementation of these NFs of the operator core network 106 may be executed by one or more controllers 254 on which these network functions are orchestrated or otherwise configured to execute utilizing processors and memory of the one or more controllers 254. The NFs may be implemented as physical and/or virtual network functions, container network functions, and/or cloud-native network functions.

Notably, nomenclature used herein is used with respect to the 3GPP 5G architecture. In other aspects, one or more of the network functions of the operator core network 106 may take different forms, including consolidated or distributed forms that perform the same general operations. For example, the AMF 230 in the 3GPP 5G architecture is configured for various functions relating to security and access management and authorization, including registration management, connection management, paging, and mobility management; in other forms, such as a 4G architecture, the AMF 230 of FIG. 2 may take the form of a mobility management entity (MME). The operator core network 106 may be generally said to authorize rights to and facilitate access to an application server/service such as provided by application function(s) requested by one or more UE, such as UE 110. In some embodiments, the at least one data network (DN) 207 may be coupled to the operator core network 106, for example via the network edge 205.

As shown in FIG. 1, UPF 236 represents at least one function of the operator core network 106 that may extend into the core network edge 205. In some embodiments, the RAN 202 is coupled to the UPF 236 within the core network edge 205 by a communication link that includes an N3 user plane tunnel 208. For example, the N3 user plane tunnel 208 may connect a cell site router of the RAN 204 to an N3 interface of the UPF 236. As previously mentioned, relationship history ledger 130 may be implemented at least in part by a data store 209 within the DN 207. The data store 209 may be coupled to the UPF 236 in the core network edge 205 by a N6 user plane tunnel 209. For example, the N6 user plane tunnel 209 may connect a network interface (e.g., a switch, router and/or gateway) of the DN 207 to an N6 interface of the UPF 236. In some embodiments, the relationship history ledger 130 may be implemented at least in part as a component of the operator core network 106.

The AMF 230 facilitates mobility management, registration management, and connection management for 3GPP devices such as a 3GPP UE 110. ANDSP 232 facilitates mobility management, registration management, and connection management for non-3GPP devices. AUSF 234 may receive authentication requests from the AMF 230 and interacts with UDM 244, for example, for SIM authentication and/or to authenticate a 3GPP UE 110. N3IWF 238 provides a secure gateway for non-3GPP network access, which may be used for providing connections for non-3GPP UE 110 access to the operator core network 106 over a non-3GPP access network (such as access network 204, for example). SMF module 240 facilitates initial creation of protocol data unit (PDU) sessions using session establishment procedures. The PCF 242 maintains and applies policy control decisions and subscription information. Additionally, in some aspects, the PCF 242 maintains quality of service (QoS) policy rules. For example, the QoS rules stored in a unified data repository (UDR) 246 can identify a set of access permissions, resource allocations, or any other QoS policy established by an operator. The Unstructured Data Storage Function (UDSF) 247 may store dynamic state data, structured and unstructured data related to network function of the operator core network 106. That is the UDSF 247 may support storage and retrieval of structured and/or unstructured data by a network function of the operator core network, including the REMNF 120. In some embodiments, the relationship entity manager network function 120 may query subscription information for the UEs 110 from other network functions of the operator core network 106 such as the UDR 246 and/or UDSF 247 to confirm that each of the proposed members of the UE entity have a subscription that permits them to form the relationship entity, or not. In some embodiments, the PCF 242 maintains subscription information indicating one or more services and/or micro-services subscribed to by each UE 110. The UDM 244 manages network user data including, but not limited to, data storage management, subscription management, policy control, and core network 106 exposure. NWDAF 248 collects data (for example, from UE, other network functions, application functions and operations, administration, and maintenance (OAM) systems) that can be used for network data analytics. The OSS 252 is responsible for the management and orchestration of the operator core network 106, and the various physical, virtual network functions, container network functions, controllers, compute nodes, and other elements that implement the operator core network 106.

Some aspects of network environment 200 include the UDR 246 and/or UDSF 249 storing information relating to access control and service and/or micro-service subscriptions, including information about relationship entities managed by the REMNF 120. The UDR 246 and/or UDSF 249 may be configured to store information relating to such subscriber information and may be accessible by multiple different NFs in order to perform desirable functions. For example, the UDR 246 may be accessed by the AMF 230 in order to determine subscriber information pertaining the UE 110, accessed by a PCF 242 to obtain policy related data, accessed by NEF 250 to obtain data that is permitted for exposure to third party applications (such as applications executed by UE 110, for example). Other functions of the NEF 250 may include monitoring of UE related events and posting information about those events for use by external entities, and providing an interface for provisioning UEs (via PCF 242) and reporting provisioning events to the UDR 246. Although depicted as a unified data management module, UDR 246 can be implemented as a plurality of network function (NF) specific data management modules.

The UPF 236 is generally configured to facilitate user plane operation relating to packet routing and forwarding, interconnection to a data network (e.g., DN 207), policy enforcement, and data buffering, among other operations. Using network slicing (e.g., using 5G software-defined networking (SDN) and/or 5G network slice selection function (NSSF)), the UPF 236 may establish a dedicated network slice for one or more data channels of the UE 110 that act as, in essence, as a distinct network (for example, establishing its own QoS, provisioning, and/or security) within the same physical network architecture of the core network edge 205. For example, in different implementations, a UE 110 may be assigned a network slick such as an Enhanced Mobile Broadband (eMBB) 5G network slice, a Massive Machine Type Communications (MMTC) 5G network slice, an Ultra-Reliable Low Latency Communication (URLLC) 5G network slice, or a Public Safety (PS) 5G network slice.

In some embodiments, the access network 104 comprises a non-3GPP access network 204 (such as a customer premise equipment (CPE) network for example). For example, the access network 204 may comprise a wide area network (WAN) or local area network (LAN) and/or may include one or more wireless access points (WAPs) 220. In such embodiments, the non-3GPP access network 204 represents an untrusted network from the perspective of the operator core network 106, and the UE 110 that access the access network 204 may represent untrusted UE 110. Accordingly, communication between the operator core network 106 and UE 110 connecting via the access network 204 may be established via the non-3GPP Interworking Function (N3IWF) 238. For example, in some embodiments, a UE 110 may authenticate with a WAP 220 of the access network 204 to establish a wireless communications link with the access network 204. In some embodiments, a UE 110 may be coupled using a network cable to establish a wired network communication link with the access network 204. The non-3GPP access network 204 may be coupled to, and authenticated with, the N3IWF 238 of the operator core network 106. For example, an IPsec user plane tunnel and/or IPsec control plane tunnel may be created to establish a secure communication link between the UE 110 and the N3IWF 238. The N3IWF 238 may be coupled to the UPF 236 by a communication link that includes an N3 user plane tunnel 208. For example, the N3 user plane tunnel 208 may connect a router or network gateway of the non-3GPP access network 204 to an N3 interface of the UPF 236.

Figure 3A:
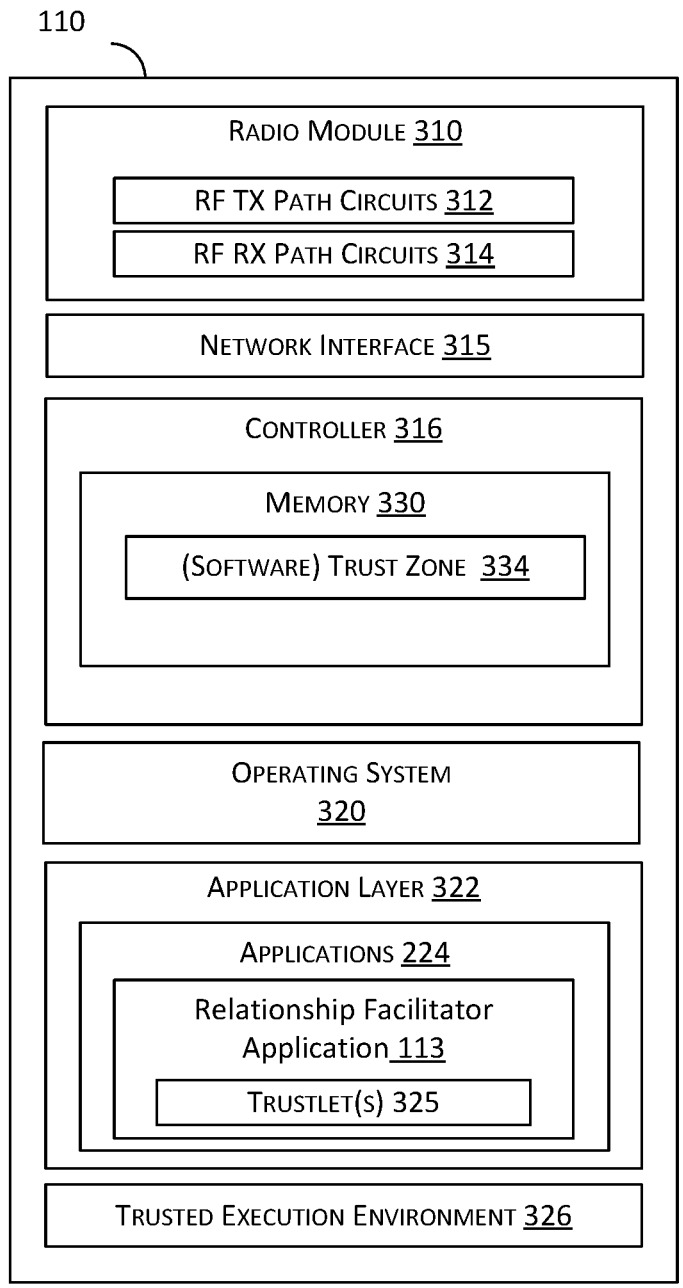
FIGS. 3A and 3B are illustrating an example user equipment (UE), in accordance with some embodiments described herein.

With reference now to FIG. 3A, FIG. 3A illustrates an example UE 110 that may implement a client member UE 112 and/or a service appliance 114 of a relationship entity 116. Although some UEs may include different or other components, generally UE 110 may include at least one radio module 310 that includes one or more RF transmit (TX) path 312 circuits, one or more RF receive (RX) path 314 circuits, and a controller 316. Configuration of the RF TX path 312 and/or RF RX path 314 may be controlled by the radio module 310, for example based on commands from the operating system 320 or other applications (e.g., relationship facilitator application 113 and/or other application(s) 324) executed on the controller 316. In some embodiments one or both of the TX path 312 and/or RF RX path 314 may comprise a plurality of RF paths, each corresponding to different frequency bands. In some embodiments, the UE 110 in FIG. 3A may authenticate with the operator core network 106 and access the telecommunications network through the access network 104, for example, using the radio module 310. In some embodiments, the UE 110 may further include at least one network interface 315 for connecting to the access network 104 and/or core network edge 205 via a wired connection.

Figure 7:
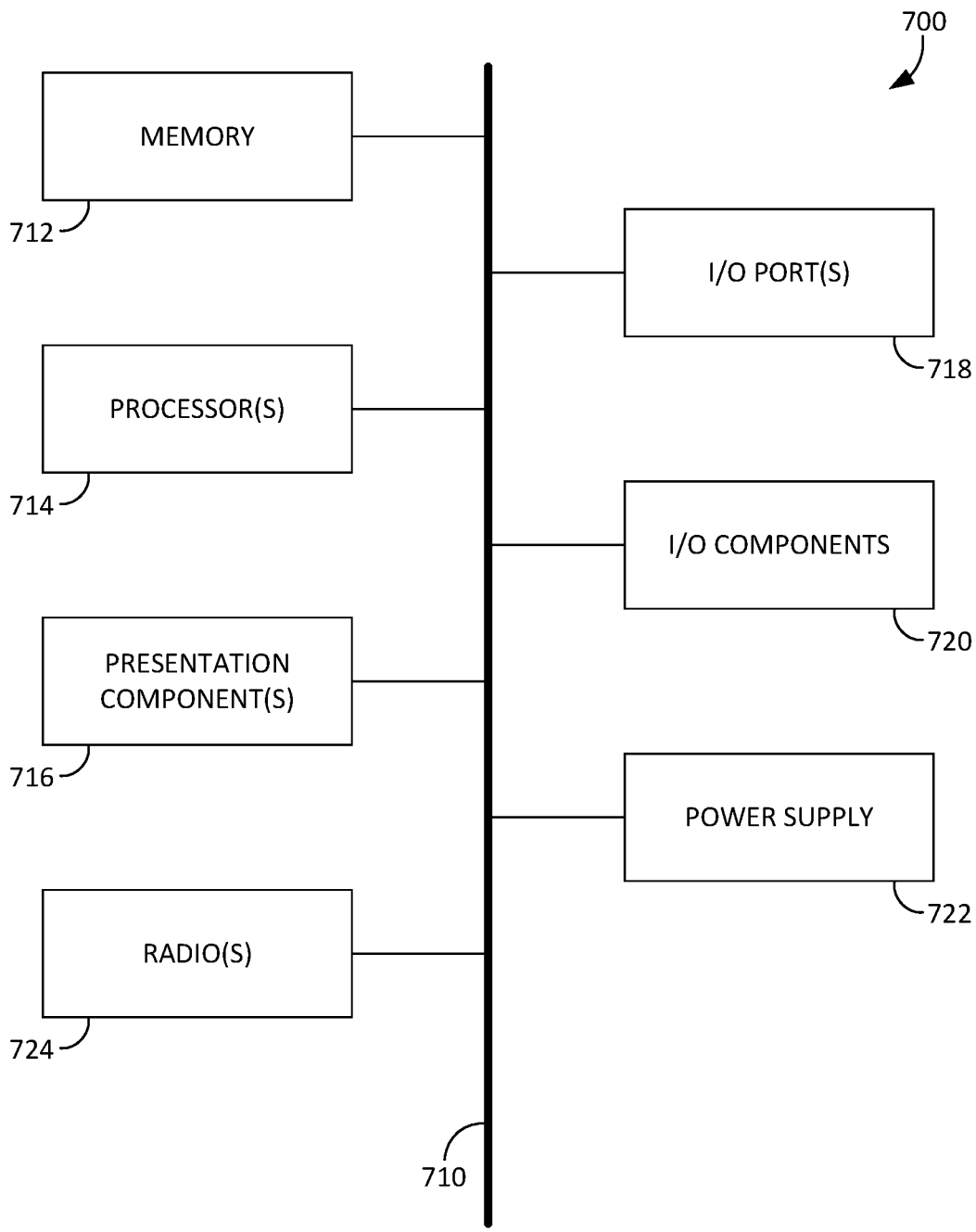
FIG. 7 is an example computing device, in accordance with some embodiments described herein.

In the embodiment shown in FIG. 3A, the UE 110 includes operating system 320 and one or more executable applications 324 (including relationship facilitator application 113) that are executed by the controller 316 to implement the one or more functions of the UE 110 described herein. The controller 316 may comprise a processor and memory, as shown in FIG. 7. Generally a UE 110 includes an application layer 322. The application layer 322 facilitates execution of the UE 110 operating system 320 and executables (including application(s) 324). In other words, the application layer 322 provides the direct user interaction environment for the UE 110. As illustrated in FIG. 2, the relationship facilitator application 113 may include one or more trustlets 325 to perform secure communications with the REMNF 120.

In some embodiments, the UE 110 may include a trusted execution environment (TEE) 326. A TEE 326 may facilitate a secure area of the processor(s) of UE 110 that provides an environment in the UE 110 where isolated execution and confidentiality features are enforced. For example, the trustlet(s) 325 of the relationship facilitator application 113 may be executed by the TEE 326. Example TEEs that may be used for UE 110 include, but are not limited to, Arm TrustZone technology, Software Guard Extensions (SGX) technology, Reduced Instruction Set Computer-Five (RISC-V), or similar technologies. In some embodiments, the TEE 326 includes a trust zone 334 established in region of memory 330. In embodiments where the UE 110 does not comprise a TEE 326 or other hardware that comprises a secure enclave, the trust zone 334 may be established in the memory 330 by the relationship facilitator application 113, and/or other code executed by the controller 316, as a software generated trust zone 334 (e.g., a software trust zone).

Generally, computer readable code executed in the TEE 326 and/or trust zone 334 is referred to as a "trustlet". A trustlet, such as trustlet(s) 325, can securely access data stored the memory 330 of the UE 110 that is otherwise inaccessible in the application layer 322. A trustlet may take the form of trusted processes, secure processes, isolated user mode (IUM) processes, or the like. For example, a trustlet executed in TEE 326 can access system level data (that is, data related to the larger machine the UE 110 in incorporated within), private and/or public keys, and similar data stored, or accessed, by the UE 110. Trustlets can be activated in response to various network or UE operations. For example, a trustlet can be activated by execution of an associated application in the application layer 322. For another example, a trustlet can be activated in response to a command generated by a network (e.g., operator core network 106 of FIG. 1) and communicated to the UE 110. The trustlet(s) activated may vary depending on the service requested. For example, a first trustlet may be activated in response to a voice service. A second trustlet may be activated in response to a messaging service. A third trustlet may be activated in response to a data service that facilitates a telemetry update. Similarly, the trustlet(s) activated may vary within a particular type of service. For example, a fourth trustlet may be activated to support the function of the relationship facilitator application 113. Specifically, the relationship facilitator application 113 may activate one or more trustlets 325 that perform functions of the relationship facilitator application 113 and/or that may interact with other trustlets. Upon activation, a trustlet performs a set of predetermined operations. The operations can include, but are not limited to: assessing data stored by the UE, (such as a set keys that are embedded directly into a processor or microcontroller during manufacturing, certificates of authority, unique device identifiers, or any other data); monitoring operations of the UE (such as monitoring processor load, microcontroller load, activation of other UE systems, or other similar UE operations); access or monitor operations of other applications executed by the UE; writing data to the memory of UE; activate another trustlet; or any combination thereof.

One or more components of the relationship facilitator application 113 may be implemented as an application of the application layer 322. The relationship facilitator application 113 may be executed in the rich environment, and/or at least partially executed in the TEE 326. That is, the relationship facilitator application 113 may be implemented at least in part as a the trustlet(s) 325 in a trusted environment protected from tampering or manipulation by a hardware Root of Trust and hosted from the TEE 326 and/or trust zone 334. In some embodiments, the relationship facilitator application 113 may store attestation data and/or other information related to events of the relationship entity 116 gathered from member UE 110 of the relationship entity 116. By utilizing the trust zone 334 for to store such information, there is a degree of trust that the registration request message and/or record blocks transmitted by the relationship facilitator application 113 to the REMNF 120 and/or relationship history ledger 130 are generated by a trusted source and free from tampering.

Figure 3B:
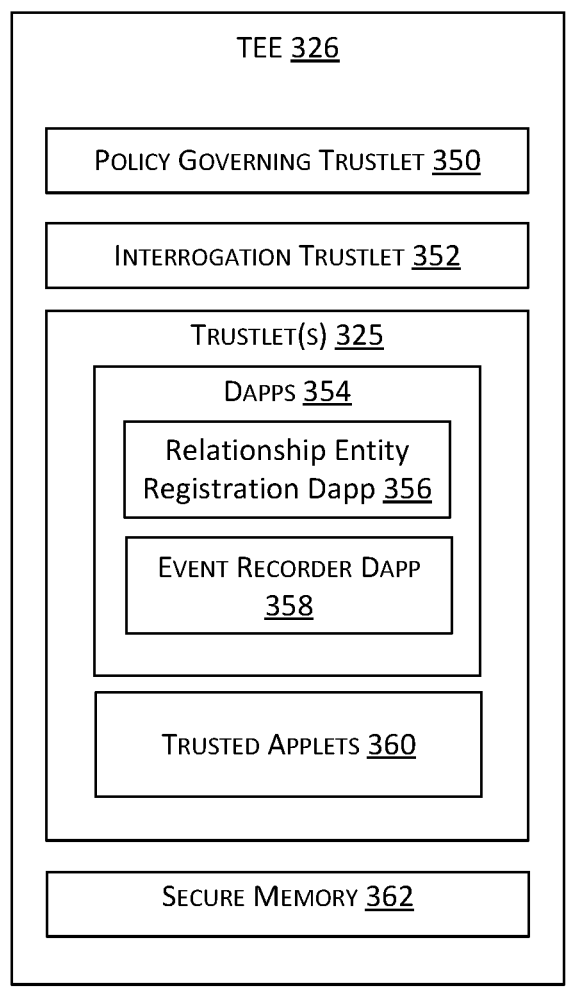

Referring now to FIG. 3B, FIG. 3B illustrates a TEE 326 within which the one or more trustlets 325 of the relationship facilitator application 113 may be executed. As depicted, TEE 326 illustratively may include a policy governing trustlet 350, an interrogation trustlet 352, the trustlets 325 of the relationship facilitator application 113, and/or a secure memory 362 (which may comprise a secure area of memory 330). In other embodiments, TEE 326 may include a fewer or greater number of trustlets.

Policy governing trustlet 350 corresponds to an illustrative example of computer readable code that is activated in response to execution of an application or operation. Upon activation, policy governing trustlet 350 may access a locally stored set of keys corresponding to the application and the UE's and/or network device's processor. Such keys may be utilized for establishing a secured communication link between the UE 110 and services provided by servers 256 of data network 207, network functions of operator core network 106 (such as the REMNF 120), and/or other secured transactions. Additionally, policy governing trustlet 350 may access a UE's and/or network device's unique device identifier (e.g., a UE ID). The policy governing trustlet 350 may communicate the accessed data to a communication network for analysis.

Interrogation trustlet 352 corresponds to an illustrative example of computer readable code that is activated in response to a command from the communication network. An interrogation trustlet can be activated by a command that is generated in response to a determination that UE 110 is an unknown device or that the UE provided anomalous data for a requested network service. In response to activation, an interrogation trustlet 352 may activate other trustlets, access additional data, or perform any other trustlet operation. The interrogation trustlet 352 may communicate the accessed data to a network function of the operator core network 106. For example, interrogation trustlet 352 can be activated in response to a command that a network function 228 or server application from a server 256 on data network 207 has requested data from one or more trustlets executed in the TEE 326. In some embodiments, one or more of the trustlet (s) 325 are activated by the interrogation trustlet(s) 325 in response to a command from a server application and/or based on instructions received by communicating with the operator core network 106, such as messages from the REMNF 120.

The trustlet(s) 325 corresponds to an illustrative example of computer readable code that may be activated in conjunction with the relationship facilitator application 113. As such, the trustlet(s) 325 may define a component of the relationship facilitator application 113. Trustlet 325 may include one or more decentralized applications 354, also known as Dapps. Dapps 354 typically operate on a blockchain or network of peer-to-peer computers. In some embodiments, Dapps 354 comprise applications that may engage directly with a blockchain ledger for determining pre-provisioned elements used for attestation data. A client member UE 112 executing a relationship facilitator application 113 may record events for the relationship entity and send record blocks to the relationship entity manager network function using the Dapps 354.

As shown in FIG. 3B, trustlet(s) 325 may include a relationship entity registration Dapp 356 that functions to securely collect UE IDs and/or attestation data from one or more UE 110 members of the relationship entity 113 and transmit that information as a record block to the REMNF 120, which may use that record bock to generate the relationship ID for the relationship entity 113 and generate a record block on the relationship history ledger 130. Trustlet(s) 325 may include an event recorder Dapp 358 that monitors (e.g., by inspecting communications traffic, querying and/or polling UE) the actions and activities of UE 110 members of the relationship entity 116. For example, the event recorder Dapp 358 may generate record blocks corresponding to the creation and termination of the relationship entity 113. In some embodiments, the event recorder Dapp 358 may be programed to generate record blocks based on predetermined events, milestones, or other triggers. For example, in one implementation, the relationship entity 113 may include a user smart phone UE and a vehicle UE. The event recorder Dapp 358 may be triggered to generate record blocks based on trigger events such as the vehicle reaching a passenger pick-up and/or destination location, a user entering a destination, payment and/or other information into the user smart phone UE. In some embodiments, the event recorder Dapp 358 may generate record blocks based on predetermined UE sensor data measurements, whether and/or when a task or service of the relationship entity 113 was completed, and/or other information selected as relevant to capture during the pendency of the relationship entity's existence.

The type of event data selected by the relationship facilitator application 113 (e.g., by Dapp 358) to record to the relationship history ledger 130 may be determined based on predefined event triggers, milestones, thresholds, or other criteria relevant to the tasks performed by the relationship entity 116. In some embodiments, event data may vary depending on characteristics of the UE 110 forming the relationship entity 116. For example, the device type of a UE 110 (whether a cell phone, tablet, automobile, train, boat, aircraft, robot, electronics equipment, or other vehicle or mechanized machinery, for example) and/or specific automated functions performed by the UE 110 (vehicle navigation, passenger or cargo transport, building automation, electrical switching, or other form of actuator operation, for example) may define what event data is considered relevant. In another example, what event data is selected to for inclusion in a record block may be defined by terms of a subscription. The type of data selected as event data to record to the relationship history ledger 130 may also be based on factors such as a wireless service type or a service level being offered to one or more of the UE 110 by the operator core network 106. For example, whether a UE 110 is operating on an Enhanced Mobile Broadband (EMBB) 5G network slice, a Massive Machine Type Communications (mMTC) 5G network slice, an Ultra-Reliable Low Latency Communication (URLLC) 5G network slice, or a Public Safety (PS) 5G network slice, may be considered by the Dapps 354 in determining what data should be monitored at the UE 110 and stored as event data into the relationship history ledger 120.

Distributed applications, such as Dapps 354, may comprises a top-tier definition for an application programmable interface (API) that is coded specifically to control a blockchain or distributed ledger instance and, in some implementations, are embedded directly into the blocks themselves (to form what is referred to as a smart contract (SC)). When a distributed application, such as one of the Dapps 354, is implemented using one or more smart contracts, there can be as many stipulations as needed programmed into the smart contract to satisfy the participants (i.e., the wireless network provider and/or the UE owner/operator) that the data is gathered and recorded with integrity. Such a smart contract utilizes "if/when . . . then . . . " rules that govern the data indicators and to explore possible exceptions that might affect the fidelity of the collected TC data and its viability as trusted data. In some implementations, exceptions are delegated to a reference chain that contains variations of programming that differ from the priority smart contract program.

Generally, the Dapps 354 may be placed behind a hardware Root of Trust (e.g., within the TEE 326), providing for total attestation of UE member attachment data and record blocks generated by the relationship facilitator application 113. The wireless network operator (e.g., the service carrier) may hold the certificates of authority that created any associated secure area and those certificates may be stored in a protected space. If the UE 110 does not support a TEE 326 or other hardware root of trust mechanism, then the trustlets 325 and/or Dapps 354 may instead be implemented in the rich environment (RE) of the UE 110 and utilize a software trust mechanism to generate the trust zone 334. In some embodiments, other trusted applets 360 may also be executed to perform one or more secure operations to implement functions of the relationship facilitator application 113 either instead or, or in conjunction with, the Dapps 354.

In some embodiments, the one or more of the trustlets 325 and/or Dapps 354 may be loaded onto the UE by the relationship entity manager network function 120 or other network function of the operator core network 106. For example, in some embodiments, a first UE 110 and a second UE 110 may initiate an initial handshake to form the relationship entity 116 using the relationship facilitator application 113 (which may have been acquired, for example from a cloud based application store or other source). During this initial handshake, the first UE 110 may obtain UE ID and/or attestation data from the second UE. The first UE may then transmit the registration request message to the REMNF 120 using the relationship entity registration Dapp 356 (which may be, for example, a pre-loaded component of the relationship facilitator application 113. If the relationship entity manager network function 120 grants the registration request, a network function of the operator core network 106 (such as the REMNF 120) may load onto the first UE 110 one or more addition trustlets 325 (which may become components of the relationship facilitation application 113), such as the event recorder Dapp 358, which may be authorized to generate record blocks for inclusion in the relationship history ledger 130. Because the Dapp 358 was provided to the first UE 110 by the operator core network 106 it may be trusted to directly generate record blocks for recordation to the relationship history ledger 130. In some embodiments, the event recorder Dapp 358 may directly write to the relationship history ledger 130 under the relationship ID assigned to the relationship entity 113. In some embodiments, the event recorder Dapp 358 may forward record blocks it generates to the relationship entity manager network function 120, which may (using its own Dapp) record the record blocks to the relationship history ledger 130 under the relationship ID assigned to the relationship entity 113.

Figure 4A:
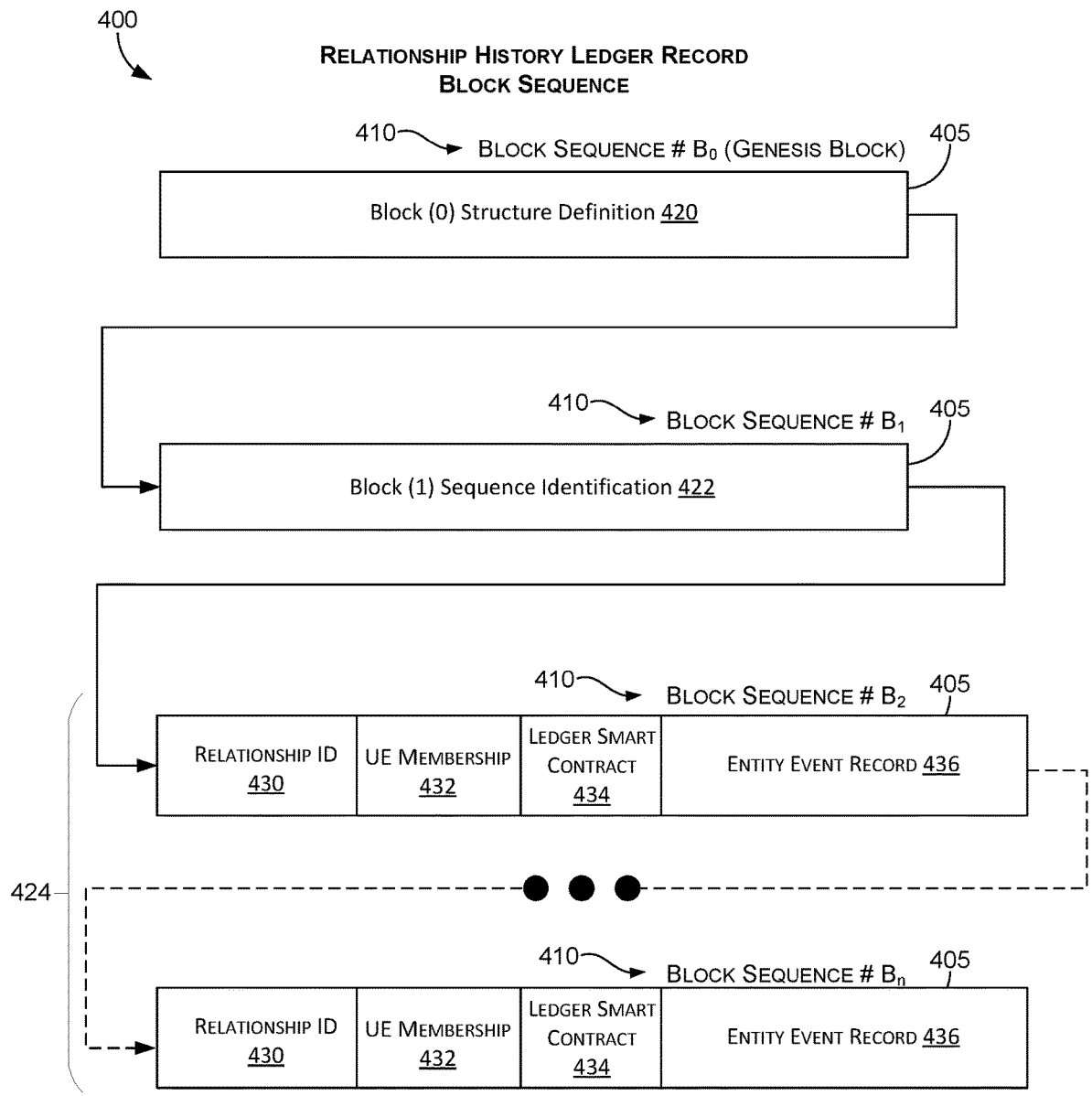
FIGS. 4A, 4B and 4C are diagrams illustrating an example relationship history ledger record block sequence, in accordance with some embodiments described herein.

FIG. 4A is a diagram illustrating a record block sequence 400 (e.g., a blockchain) of record blocks for storing record blocks of entity events generated, for example by the event recorder Dapp 358 or other trustlet 325 or trusted application of the relationship facilitator application 113. A record block sequence 400 may comprise a sequence of blocks 405, each block 405 associated with event data captured by the Dapp 358. In some embodiments, the blocks 405 are structured as block-chain blocks for inclusion in a block-chain structure of the relationship history ledger 130. In some embodiments, each block 405 may include a block sequence number 410. In some embodiments, blocks 405 of the record block sequence 400 may be recorded to the relationship history ledger 130 using a Dapp for the REMNF 120 and/or a Dapp of the relationship facilitation application 113.

Figure 4B:
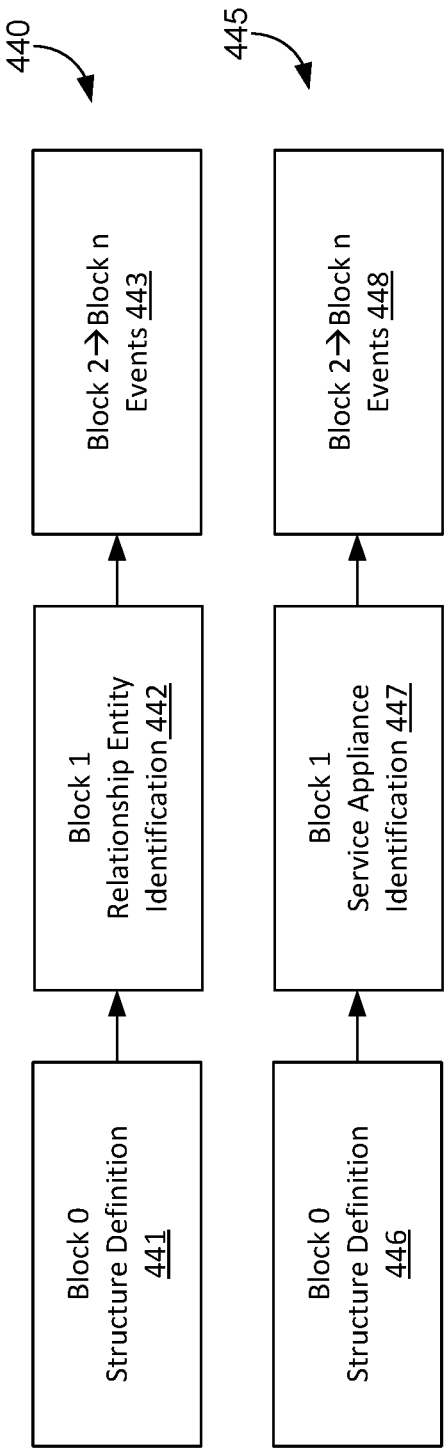

As shown in FIG. 4B, a record block sequence 400 for recordation to the relationship history ledger 130 may be structured in different ways. For example, at 440, a sequence is illustrated for a chain of blocks associated specifically with the relationship entity. At 445, a sequence is illustrated for a chain of blocks associated specifically with one of the UE 110 that is a member of the relationship entity.

For sequence 440, the first block 441, may be referred to as block 0, or the genesis block. The genesis block 441 may be used to establish the structural definition of the chain formed by the record block sequence 440. For example, the first block 441 may define the number, names, and/or size of fields for at least the blocks of the sequence that will record entity event data. The second block 442 may comprise an identification block, that includes the relationship ID assigned to the relationship entity 116 by the REMNF 120. For example, in response to approving a registration request message received from a relationship facilitator application 113, the REMNF 120 may assign the registration ID to the relationship entity 116 and record that relationship ID to the identification block 442 of the record block sequence 400, indicating that the sequence 440 is a sequence and/or blockchain that corresponds to, and comprises event data, for that relationship entity. Once the identification block 442 is formed, then subsequent event data from record blocks received from the event recorder Dapp 358 may be stored in subsequent event blocks 443 (e.g., starting at block 2).

For sequence 445, the first block 446, may be referred to as block 0, or the genesis block. The genesis block 446 may be used to establish the structural definition of the chain formed by the record block sequence 445. For example, the first block 441 may define the number, names, and/or size of fields for at least the blocks of the sequence that will record entity event data. The second block 447 may comprise an identification block, that includes the UE ID, device ID, or other identifier assigned to a UE member of the relationship entity 116, such as a client member UE 112 or service appliance UE. For example, the sequence 445 may comprise a chain associated with an automated vehicle, smart machine, or other smart appliance. Each time that UE is involved in a different relationship entity 116, event data from record blocks generated from each respective entity are added to the sequence 445 as event blocks 448. As such, the sequence 440 may be structured to represent a sequence of actions, events, and/or other collected data, covering the life span of the relationship entity 116, whereas the sequence 445 may in contrast represent events over the life span of a UE 110—documenting the various relationship entities 116 in which it has been a member. It should be understood that the use of sequences 440 and 445 need not be mutually exclusive. That is, in some embodiments, the relationship history ledger 130 may comprise multiple ledgers, and may store event data relevant to relationship entity activities in a sequence such as sequence 440, sequence 445, and/or other sequence structures. In some embodiments, a block sequence may refer to another earlier created block sequence.

Returning to FIG. 4A, here this general sequence 400 includes a first block 420 (comprising a Block 0, or genesis block, such as blocks 441 or 446 in FIG. 4B, for example), and a second block 422 that comprises a sequence identification block 422 (such as blocks 442 or 446 in FIG. 4B, for example). The block sequence 400 may further include one or more event blocks, shown at 424, following the first two blocks 420 and 442. Each block 424 may include the relationship ID field 430 for indicating the relationship ID assigned to the relationship entity 116, and may include a UE membership field 432, for indicating identifiers for one or more of the UE 110 that are members of the relationship entity 116. In some embodiments, where a block 405 comprises part of a smart contract, then implementing code associated with a Dapp may also be included within the block 405 as illustrated in FIG. 4A at 434. Data from record blocks generated by the event recorder Dapp may be recorded to one or more entity even record fields 436.

Figure 4C:
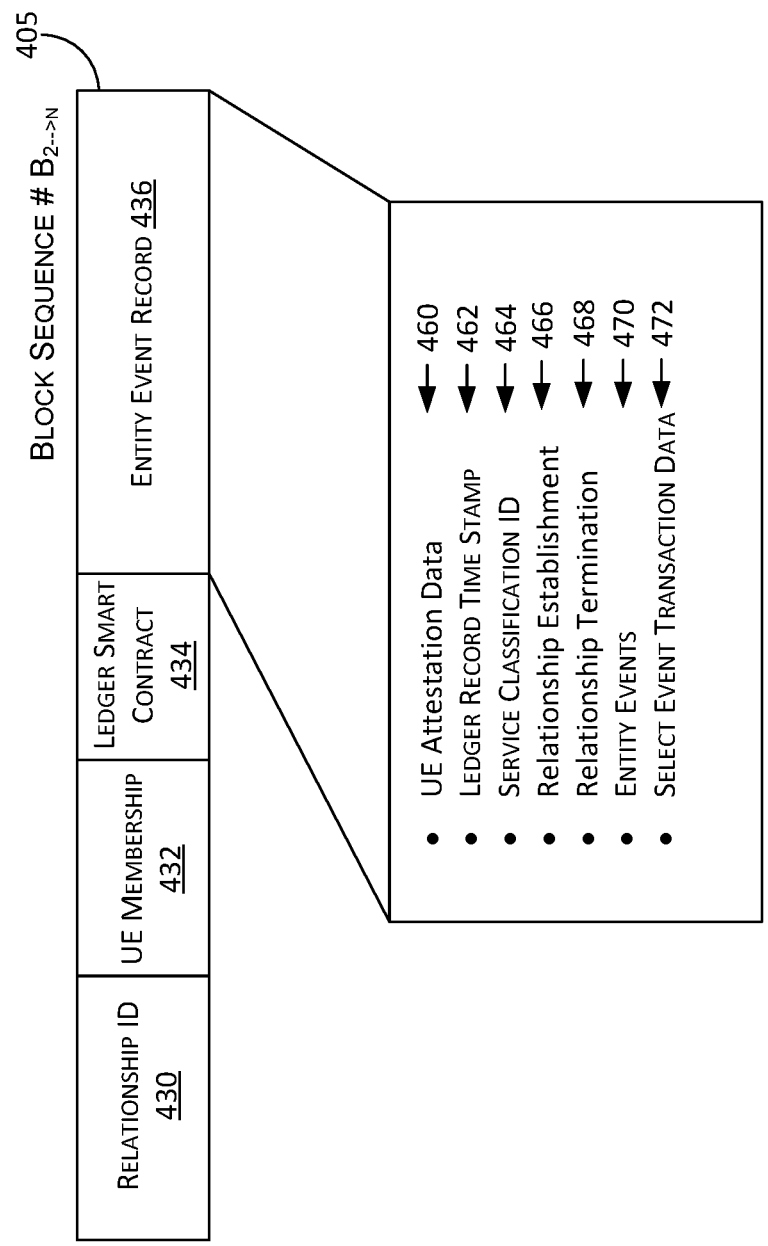

As further shown in FIG. 4C, example entity event record fields that may be used include any one or more of, but not limited to, the following. An entity event record 436 may include UE attestation data 460, which may include the attestation data for UE members of the relationship entity, provided by a registration Dapp 356 or other component of a relationship facilitator application 113. The entity event record 436 may include ledger fields comprising a ledger record timestamp 462, indicating a time and/or date of the record block. The entity event record 436 may include a service classification ID 464, relationship establishment data 466, relationship termination data 468, and/or data regarding entity events 470. In some embodiments, the event recorder Dapp 358 may be programed to generate record blocks that include data regarding entity event 470 based on predetermined events, milestones, or other triggers. As previously discussed, an event recorder Dapp 358 may be triggered to generate record blocks that include data for recordation as data regarding entity events 470 based on trigger events such as starting and/or completing a task (e.g., a vehicle reaching a passenger pick-up and/or destination location) or a user entering information into a UE 110. In some embodiments, the event recorder Dapp 358 may generate record blocks based on predetermined UE sensor data measurements, whether and/or when a task or service of the relationship entity 113 was completed, and/or other information selected as relevant to capture during the pendency of the relationship entity's existence. In some embodiments, an entity event record 436 may include event transaction data 472, which may include information about interactions between UE 110 of the relationship entity 116, such as messages, data, control instructions, sensor data, images, audio, file transfers, and/or other exchanges of data between UE members of the relationship entity 116.

Figure 5:
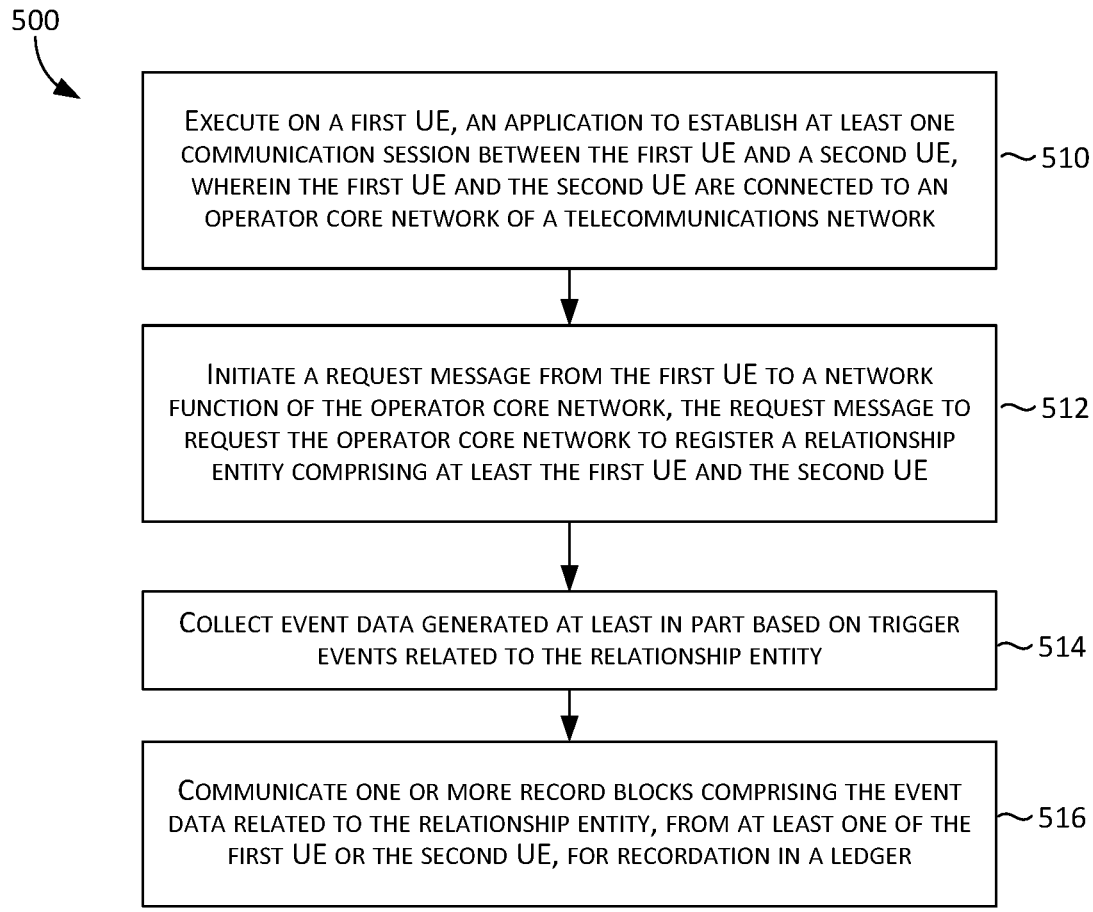
FIG. 5 is a flow chart illustrating an example method for relationship entity management, in accordance with some embodiments described herein.

FIG. 5 is a flow chart illustrating a method 500 for operating a relationship entity for telecommunications network user equipment, according to some embodiments. It should be understood that the features and elements described herein with respect to the method of FIG. 5 may be used in conjunction with, in combination with, or substituted for elements of, any of the other embodiments discussed herein and vice versa. Further, it should be understood that the functions, structures, and other descriptions of elements for embodiments described in FIG. 5 may apply to like or similarly named or described elements across any of the figured and/or embodiments described herein and vice versa. In some embodiments, elements of method 500 are implemented utilizing one or more processing units of a UE 110, as disclosed in any of the embodiments herein.

The method 500 at 510 includes executing (e.g., on a processor(s) of a first UE), an application to establish at least one communication session between the first UE and a second UE, wherein the first UE and the second UE are connected to an operator core network of a telecommunications network. As previously discussed, the first UE and/or the second UE may be coupled to the operator core network through either a $3^{rd}$ Generation Partnership Project (3GPP) radio access network or through or a non-3GPP access network. In some embodiments, the application may include, at least in part, one or more trustlets, which may include one or more Dapps. For example, in some embodiments, the one or more trustlets of the application may include the relationship entity registration Dapp 356 and/or the event recorder Dapp 358. The application may be executed, at least in part in a trusted execution environment and/or software trust zone.

The method 500 at 512 includes transmitting a request message from the first UE to a network function of the operator core network, the request message to request the operator core network to register a relationship entity comprising at least the first UE and the second UE. In some embodiments, the request message may comprise one or both of identification information for first UE and the second UE, and/or attestation data for each of the first UE and the second UE. The attestation data may comprise a set of one or more pre-provisioned elements for each of the UE forming the relationship entity. In some embodiments, the attestation data may comprise a registration ID that is computed by applying a hash function, statistical computation, or similar function, to the set of one or more pre-provisioned elements. The set of pre-provisioned elements may include hardware identifiers and/or shared keys, and/or other identifiers or elements as discussed herein. The pre-provisioned elements may be processed to define a registration ID associated with the individual UE.

The method 500 at 514 includes collecting event data generated at least in part based on trigger events related to the relationship entity. For example, the application may track tasks that are performed using the UE on behalf of the relationship entity and collect data, such as but not limited to, actions initiated, data transfers, sensor measurements, data and control messages exchanged between UE of the relationship entity, and/or other events. For example, the first UE may send a command to the second UE to perform an action. The command may instruct the second UE to obtain data from a sensor, such to capture an image from a camera sensor, for example. The control message from the first UE to the second UE may define event data that triggers the application to generate a record block. In some embodiments, a response message from the second UE to the first UE with the image data may define another set of event data that triggers the application to generate a record block. That is, the issuance of command and control messages and/or messages carrying response data, between the first UE and the second UE may be trigger events that cause the application to collect event data. In other embodiments, sensor readings out of acceptable bounds of an acceptance criteria may be a trigger event that causes the application to collect event data (e.g., such as an indication of the out of bounds sensor reading. Similarly, an alert, warning, and/or alarm signal generated by any of the UE members of the relationship entity may be trigger events that cause the application to collect event data. In some embodiments, the application may periodically query or poll member UE of the relationship entity to collect the event data. In some embodiments, the event data may instead, or additionally, be pushed to the application data from member UE of the relationship entity.

The method 500 at 516 includes communicating one or more record blocks comprising the event data related to the relationship entity, from at least one of the first UE or the second UE, to the network function for recordation in a relationship history ledger. The record block may include one or more of, but not limited to, an indication that the relationship entity is created, an indication that the relationship entity is terminated; an indication that a predetermined event has occurred, an indication of sensor data measurements, an indication that a task of the relationship entity is started, an indication that a task of the relationship entity is completed, and/or an indication of an interaction between the first UE and the second UE. In some embodiments, the one or more record blocks are recorded to the relationship history ledger using a relationship ID assigned to the relationship entity by the network function in response to the request message. As previously mentioned, the relationship history ledger comprises at least one of a Hyperledger, a distributed ledger technology (DLT) ledger, or a blockchain technology ledger.

Figure 6:
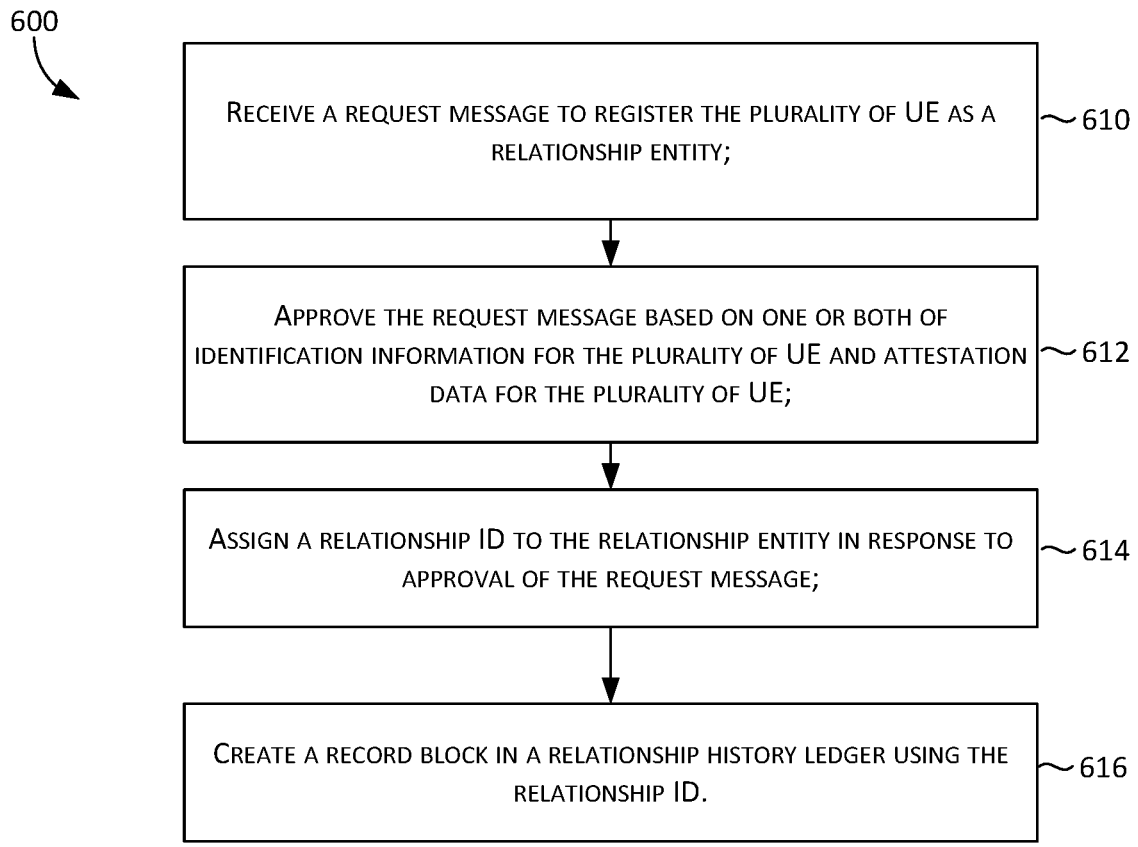
FIG. 6 is a flow chart illustrating an example method for example method for relationship entity management, in accordance with some embodiments described herein.

FIG. 6 is a flow chart illustrating a method 600 for operating a relationship entity for telecommunications network user equipment, according to some embodiments. It should be understood that the features and elements described herein with respect to the method of FIG. 6 may be used in conjunction with, in combination with, or substituted for elements of, any of the other embodiments discussed herein and vice versa. Further, it should be understood that the functions, structures, and other descriptions of elements for embodiments described in FIG. 6 may apply to like or similarly named or described elements across any of the figured and/or embodiments described herein and vice versa. In some embodiments, elements of method 800 are implemented utilizing a network function of an operator core network, such as the relationship entity manager networking function 120 as disclosed in any of the embodiments herein.

The method 600 at 610 includes receiving a request message to register a plurality of UE as a relationship entity. The plurality of user equipment (UE) communicates with the operator core network through at least one access network. The at least one access network may comprise one or more 3GPP radio access networks, one or more non-3GPP access networks, or a combination of both.

The method 600 at 612 includes approving the request message based on one or both of identification information for the plurality of UE and attestation data for the plurality of UE. The attestation data may comprise a set of one or more pre-provisioned elements for each of the UE forming the relationship entity. In some embodiments, the attestation data may comprise a registration ID that is computed by applying a hash function, statistical computation, or similar function, to the set of one or more pre-provisioned elements. The set of pre-provisioned elements may include hardware identifiers and/or shared keys, and/or other identifiers or elements as discussed herein. The pre-provisioned elements may be processed to define a registration ID associated with the individual UE. In some embodiment the network function may approve the request message further based on evaluating network service subscription information for each of the plurality of UE. That is, the network function may obtain UE subscription information for the individual constituent UE (e.g., from another network function) to confirm that each of the proposed members of the UE entity have a subscription that permits them to form the relationship entity, or not.

The method 600 at 614 includes assigning a relationship ID to the relationship entity in response to approval of the request message. The operator core network may authorize access to one or more services of one or more network functions of the operator core network to UE members of the relationship entity based on the relationship ID. For example, a UE acting on behalf of the relationship entity may communicate the registration request message that includes UE identifiers (ID) of the UE constituent members of the relationship entity, and/or one or more items of attestation data, which the relationship entity manager network function may use to generate a relationship ID and assign that relationship ID to the relationship entity. In some embodiments, the relationship ID may further be generated by incorporating information such as, but not limited to, the task the relationship entity is performing and/or the type or category of network service that the network is to provide to the relationship entity. The establishment, activities, events, and dissolution, of the relationship entity may all be tracked and recorded to the ledger using the relationship ID. In addition to recording actions of the relationship entity to a ledger, the operator core network may use the relationship ID to authorize and/or unlock network services for use by the relationship entity. For example, UE constituent members of the relationship entity may be ineligible to utilize a certain low-latency network slice as individual UE, but once they become members of a relationship entity associated with a certain task, the may be granted access to that certain low-latency network slice to transport session data for the relationship entity. In some embodiments, a relationship entity manager network function that generates the relationship ID may update one or more network functions of the operator core network to indicate what services that the relationship entity may subscribe to and/or is eligible to access under the issued relationship ID. In some embodiments, the relationship ID assigned to a relationship entity may be computed as a function of the attestation data provided to the relationship entity manager network function and/or an indication of the task the relationship entity is performing and/or the type of network service that the network is to provide to the relationship entity. For example, in some embodiments, the relationship entity manager network function may use a hash algorithm to compute the relationship ID using the attestation data received from the registration request message and/or a code related to a task and/or network service associated with the relationship entity.

The method 600 at 616 includes creating a record block in a relationship history ledger using the relationship ID. The relationship history ledger may comprise least one of a Hyperledger, a distributed ledger technology (DLT) ledger, or a blockchain technology ledger. As illustrated in FIG. 4B, the one or more record blocks block may be stored to the relationship history ledger using at least one of a block sequence assigned to a first UE of the plurality of UE, or a block sequence assigned to the relationship entity. In some embodiments, the relationship history ledger may comprise multiple ledgers, and may store event data relevant to relationship entity activities in a sequence such as sequence 440, sequence 445, and/or other sequence structures. In some embodiments, a block sequence may refer to another earlier created block sequence.

In some embodiments, the method may further include storing one or more record blocks received from at least a first UE of the plurality of UE to the relationship history ledger using the relationship ID, the one or more record blocks comprising the event data related to the relationship entity. A record block may include one or more of, but not limited to, an indication that the relationship entity is created, an indication that the relationship entity is terminated; an indication that a predetermined event has occurred, an indication of sensor data measurements, an indication that a task of the relationship entity is started, an indication that a task of the relationship entity is completed, and/or an indication of an interaction between the first UE and the second UE. In some embodiments, the one or more record blocks are recorded to the relationship history ledger using a relationship ID assigned to the relationship entity by the network function in response to the request message.

In addition to documenting activities of the relationship entity, records created for the relationship entity may further include identifying network end-point hardware, and/or intervening network devices, used to transport the data associated with the activities of the relationship entity. For example, if data communicated between a first UE and a second UE of the relationship entity passed through a particular network switch in a particular data center, and/or if a network service provided to a member of the relationship entity passed through a particular network switch in a particular data center, then identifying information for the network switch and/or data center may be captured and associated with the relationship entity. That is, an inventory of network resources used to support the activities of the relationship entity may be captured to the relationship history ledger and referenced using the relationship ID.

Referring to FIG. 7, a diagram is depicted of an exemplary computing environment suitable for use in implementations of the present disclosure. In particular, the exemplary computer environment is shown and designated generally as computing device 700. Computing device 700 is but one example of a suitable computing environment and is not intended to suggest any limitation as to the scope of use or functionality of the embodiments described herein. Neither should computing device 700 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 7, computing device 700 includes bus 710 that directly or indirectly couples the following devices: memory 712, one or more processors 714, one or more presentation components 716, input/output (I/O) ports 718, I/O components 720, power supply 722, and radio 724. Bus 710 represents what may be one or more busses (such as an address bus, data bus, or combination thereof). The devices of FIG. 7 are shown with lines for the sake of clarity. However, it should be understood that the functions performed by one or more components of the computing device 700 may be combined or distributed amongst the various components. For example, a presentation component such as a display device may be one of I/O components 720. In some embodiments, the UE 110 of a relationship entity 116 may comprise a computing device 700. The processors of computing device 700, such as one or more processors 714, have memory. The present disclosure hereof recognizes that such is the nature of the art, and reiterates that FIG. 7 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 7 and refer to "computer" or "computing device." In some embodiments, the relationship facilitator application 113, or other components of the UE 110, or other components as described in any of the examples of this disclosure, may be implemented at least in part by code executed by the one or more processors(s) 714. The trust zone 334 may be implemented at least in part using memory 712.

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes non-transient RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media and computer-readable media do not comprise a propagated data signal or signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. Memory 712 may be removable, non-removable, or a combination thereof. Exemplary memory includes solid-state memory, hard drives, optical-disc drives, etc. Computing device 700 includes one or more processors 714 that read data from various entities such as bus 710, memory 712 or I/O components 720. One or more presentation components 716 presents data indications to a person or other device. Exemplary one or more presentation components 716 include a display device, speaker, printing component, vibrating component, etc. I/O ports 718 allow computing device 700 to be logically coupled to other devices including I/O components 720, some of which may be built in computing device 700. Illustrative I/O components 720 include a microphone, joystick, game pad, satellite dish, scanner, printer, wireless device, etc.

Radio(s) 724 represents a radio that facilitates communication with a wireless telecommunications network. For example, radio(s) 724 may be used to establish communications with components of the access network 104, operator core network 106 and/or core network edge 205. Illustrative wireless telecommunications technologies include CDMA, GPRS, TDMA, GSM, and the like. In some embodiments, the radio(s) 724 comprise circuits that implement the radio module 310 of a UE 110 as described herein. Radio(s) 724 may additionally or alternatively facilitate other types of wireless communications including Wi-Fi, WiMAX, LTE, and/or other VoIP communications. In some embodiments, radio(s) 724 may support multi-modal connections that include a combination of 3GPP radio technologies (e.g., 4G, 5G and/or 6G) and/or non-3GPP radio technologies. As can be appreciated, in various embodiments, radio(s) 724 can be configured to support multiple technologies and/or multiple radios can be utilized to support multiple technologies. In some embodiments, the radio(s) 724 may support communicating with access network comprising a terrestrial wireless communications base station and/or a space-based access network (e.g., an access network comprising a space-based wireless communications base station). A wireless telecommunications network might include an array of devices, which are not shown so as to not obscure more relevant aspects of the embodiments described herein. Components such as a base station, a communications tower, or even access points (as well as other components) can provide wireless connectivity in some embodiments.

Figure 8:
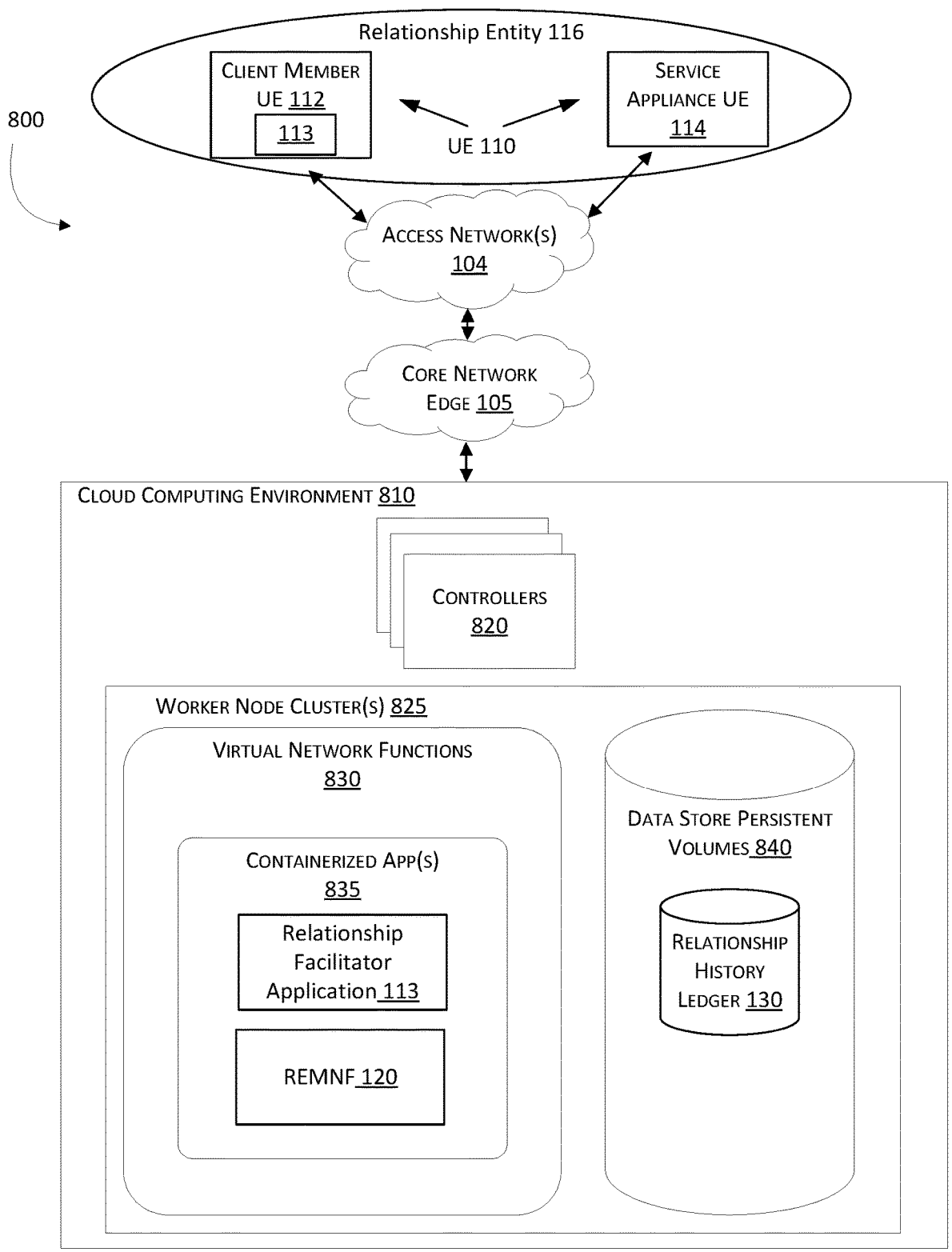
FIG. 8 is an example cloud computing platform, in accordance with some embodiments described herein.

Referring to FIG. 8, a diagram is depicted generally at 800 of an exemplary cloud computing environment 810 for implementing one or more aspects of relationship entity management, such as the relationship facilitator application 113, relationship entity management network function 120 and/or the relationship history ledger 130, implemented by the systems and methods described herein. Cloud computing environment 810 is but one example of a suitable cloud-computing environment and is not intended to suggest any limitation as to the scope of use or functionality of the embodiments presented herein. Neither should cloud-computing environment 810 be interpreted as having any dependency or requirement relating to any one or combination of components illustrated. In some embodiments, the cloud-computing environment 810 is executed within operator core network 106, the core network edge 205, or otherwise coupled to the core network edge 205 or operator core network 106.

Cloud computing environment 810 includes one or more controllers 820 comprising one or more processors and memory. The controllers 820 may comprise servers of a data center. In some embodiments, the controllers 820 are programmed to execute code to implement at least one or more aspects of the relationship facilitator application 113 and/or relationship entity management network function 120. For example, in one embodiment the relationship facilitator application 113 and/or relationship entity management network function 120 may be implemented as one or more virtual network functions (VNFs) 830 running on a worker node cluster 825 established by the controllers 820. In some embodiments, relationship facilitator application 113 may obtain one or more of the pre-provisioned elements for attestation data for one or more of the UE members of a relationship entity 116 from the VNFs 830.

The cluster of worker nodes 825 may include one or more orchestrated Kubernetes (K8s) pods that realize one or more containerized applications 835 for the relationship facilitator application 113 and/or relationship entity management network function 120. In other embodiments, another orchestration system may be used to realize the relationship facilitator application 113 and/or relationship entity management network function 120. For example the worker nodes 825 may use lightweight Kubernetes (K3s) pods, Docker Swarm instances, and/or other orchestration tools. In some embodiments, the UE 110 of a relationship entity 116 may be coupled to the controllers 820 of the cloud-computing environment 810 by access network 104 and/or core network edge 205. In some embodiments, relationship history ledger 130 may be implemented at least in part as one or more data store persistent volumes 840 in the cloud-computing environment 810.

In various alternative embodiments, system and/or device elements, method steps, or example implementations described throughout this disclosure (such as the UE, access networks, core network edge, operator core network, relationship facilitator application, relationship entity management network function, and/or any of the sub-parts thereof, for example) may be implemented at least in part using one or more computer systems, field programmable gate arrays (FPGAs), application specific integrated circuits (ASICs) or similar devices comprising a processor coupled to a memory and executing code to realize that elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer-readable media" refers to tangible memory storage devices having non-transient physical forms. Such non-transient physical forms may include computer memory devices, such as but not limited to: punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system of device having a physical, tangible form. Program instructions include, but are not limited to, computer executable instructions executed by computer system processors and hardware description languages such as Verilog or Very High Speed Integrated Circuit (VHSIC) Hardware Description Language (VHDL).

As used herein, the terms "function", "unit", "server", "node" and "module" are used to describe computer processing components and/or one or more computer executable services being executed on one or more computer processing components. In the context of this disclosure, such terms used in this manner would be understood by one skilled in the art to refer to specific network elements and not used as nonce word or intended to invoke 35 U.S.C. 112(f).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for operating a relationship entity comprising a plurality of user equipment (UE), the system comprising:
   one or more processors; and
   one or more computer-readable media storing computer-usable instructions that, when executed by the one or more processors, cause the one or more processors to:
   execute on a first UE, an application to establish at least one communication session between the first UE and a second UE, wherein the first UE and the second UE are connected to an operator core network of a telecommunications network;
   transmit a request message from the first UE to a network function of the operator core network, the request message to request the operator core network to register a relationship entity comprising at least the first UE and the second UE;
   collect event data generated at least in part based on trigger events related to the relationship entity; and
   communicate one or more record blocks comprising the event data related to the relationship entity, from at least one of the first UE or the second UE, for recordation in a relationship history ledger using a relationship ID assigned to the relationship entity by the network function in response to the request message.

2. The system of claim 1, wherein the first UE or the second UE are coupled to the operator core network through either a $3^{rd}$ Generation Partnership Project (3GPP) radio access network or through or a non-3GPP access network.

3. The system of claim 1, the one or more processors further to execute one or more trustlets to communicate the one or more record blocks, the one or more trustlets received from the network function in response to the request message.

4. The system of claim 3, wherein the one or more trustlets comprise at least one decentralized application (Dapp).

5. The system of claim 1, wherein the application is executed at least in part in a trusted execution environment or software trust zone of the first UE.

6. The system of claim 1, the one or more processors further to generate the one or more record blocks to include at least one of:
an indication that the relationship entity is created;
an indication that the relationship entity is terminated;
an indication that a predetermined event has occurred;
an indication of sensor data measurements;
an indication that a task of the relationship entity is started;
an indication that a task of the relationship entity is completed; and
an indication of an interaction between the first UE and the second UE.

7. The system of claim 1, wherein the request message includes one or both of identification information for each of the first UE and the second UE, and attestation data for each of the first UE and the second UE.

8. The system of claim 1, wherein the relationship history ledger comprises at least one of a Hyperledger, a distributed ledger technology (DLT) ledger, or a blockchain technology ledger.

9. A telecommunications network, the network comprising:
an operator core network, wherein a plurality of user equipment (UE) communicates with the operator core network through at least one access network; and
one or more processing units to:
receive a request message to register the plurality of UE as a relationship entity;
approve the request message based on one or both of identification information for the plurality of UE and attestation data for the plurality of UE;
assign a relationship ID to the relationship entity in response to approval of the request message;
authorize access to one or more services of one or more network functions of the operator core network based on the relationship ID; and
create a record block in a relationship history ledger using the relationship ID.

10. The network of claim 9, the one or more processing units further to:
store one or more record blocks received from at least a first UE of the plurality of UE to the relationship history ledger using the relationship ID, the one or more record blocks comprising event data related to the relationship entity.

11. The network of claim 10, the one or more processing units further to store the one or more record blocks to the relationship history ledger using at least one of:
a block sequence assigned to the first UE of the plurality of UE; or
a block sequence assigned to the relationship entity.

12. The network of claim 10, wherein the one or more record blocks include at least one of:
an indication that the relationship entity is created;
an indication that the relationship entity is terminated;
an indication that a predetermined event has occurred;
an indication of sensor data measurements;
an indication that a task of the relationship entity is started;
an indication that a task of the relationship entity is completed; and
an indication of an interaction between the first UE and a second UE of the plurality of UE.

13. The network of claim 9, wherein the plurality of UE is coupled to the operator core network through at least one of:
a $3^{rd}$ Generation Partnership Project (3GPP) radio access network; and
a non-3GPP access network.

14. The network of claim 9, the one or more processing units further to:
approve the request message further based on evaluating network service subscription information for each of the plurality of UE.

15. The network of claim 9 wherein the relationship history ledger comprises at least one of a Hyperledger, a distributed ledger technology (DLT) ledger, or a blockchain technology ledger.

16. A method for operating a relationship entity comprising a plurality of user equipment (UE), the method comprising:
establishing at least one communication session between a first UE and a second UE, wherein the first UE and the second UE are connected to an operator core network of a telecommunications network;
transmitting a request message from the first UE to a network function of the operator core network, the request message to request the operator core network to register a relationship entity comprising at least the first UE and the second UE;
collecting event data generated at least in part based on trigger events related to the relationship entity; and
communicating one or more record blocks comprising event data related to the relationship entity, from at least one of the first UE or the second UE, for recordation in a relationship history ledger; and
wherein the one or more record blocks include at least one of:
an indication that the relationship entity is created;
an indication that the relationship entity is terminated;
an indication that a predetermined event has occurred;
an indication of sensor data measurements;
an indication that a task of the relationship entity is started;
an indication that a task of the relationship entity is completed; and
an indication of an interaction between the first UE and the second UE.

17. The method of claim 16, wherein either the one or more record blocks are recorded to the relationship history ledger using a relationship ID assigned to the relationship entity by the network function in response to the request message.

* * * * *